(12) United States Patent
Kernbaum et al.

(10) Patent No.: US 10,774,907 B2
(45) Date of Patent: Sep. 15, 2020

(54) COMPACT INFINITELY VARIABLE TRANSMISSION

(71) Applicant: SRI International, Menlo Park, CA (US)

(72) Inventors: Alexander Kernbaum, Sunnyvale, CA (US); Murphy Kitchell, Mountain View, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 16/032,657

(22) Filed: Jul. 11, 2018

(65) Prior Publication Data
US 2018/0320766 A1 Nov. 8, 2018

Related U.S. Application Data

(63) Continuation of application No. PCT/US2017/015184, filed on Jan. 26, 2017.

(Continued)

(51) Int. Cl.
*F16H 9/16* (2006.01)
*F16H 9/04* (2006.01)
(Continued)

(52) U.S. Cl.
CPC ............... *F16H 9/16* (2013.01); *F16D 1/112* (2013.01); *F16H 9/04* (2013.01); *F16H 9/24* (2013.01);
(Continued)

(58) Field of Classification Search
CPC ...... F16H 9/16; F16H 55/56; F16H 2009/166; F16G 5/16; F16G 5/18
(Continued)

(56) References Cited

U.S. PATENT DOCUMENTS 1,446,017 A * 2/1923 Reeves ..................... F16G 5/16
474/244
1,740,087 A * 12/1929 Hall ....................... F16H 55/566
474/32
(Continued)

FOREIGN PATENT DOCUMENTS

DE 320400 C 11/1954
DE 3621280 A1 1/1988
(Continued)

OTHER PUBLICATIONS

International Searching Authority, "Written Opinion of the International Searching Authority" in application No. PCT/US2017/015184, dated Jun. 5, 2017, 5 pages.

*Primary Examiner* — Henry Y Liu
(74) *Attorney, Agent, or Firm* — McDonnell Boehnen Hulbert & Berghoff LLP

(57) ABSTRACT

A variable transmission may include a segmented pulley and a nested pulley located at least partially within the segmented pulley. The spacing between the components of the first segmented pulley may be varied to alter the transmission ratio of the variable transmission by altering the effective diameter of the segmented pulley. The nested pulley may also be a segmented pulley. In some embodiments, one of the pulleys may be rotationally fixed, and the variable transmission may comprise a compact infinitely variable transmission. The eccentricity of the compact infinitely variable transmission may be significantly less than the eccentricity of other infinitely variable transmission designs. In other embodiments, a nested pulley structure may be used to provide a compact continuously variable transmission.

13 Claims, 29 Drawing Sheets

Related U.S. Application Data

(60) Provisional application No. 62/288,466, filed on Jan. 29, 2016.

(51) Int. Cl.
  *F16H 55/56* (2006.01)
  *F16D 1/112* (2006.01)
  *F16H 9/24* (2006.01)
  *F16H 61/662* (2006.01)

(52) U.S. Cl.
  CPC ........... *F16H 55/56* (2013.01); *F16H 55/563* (2013.01); *F16H 61/6624* (2013.01); *F16H 2009/166* (2013.01)

(58) Field of Classification Search
  USPC ........................................................ 474/24
  See application file for complete search history.

(56) References Cited

U.S. PATENT DOCUMENTS

| | | | | | |
|---|---|---|---|---|---|
| 1,993,131 | A | * | 3/1935 | Borgna | F16H 9/16 474/24 |
| 2,074,997 | A | * | 3/1937 | Faltermayer | F16H 9/16 474/24 |
| 2,136,437 | A | * | 11/1938 | Hollestelle | F16H 9/16 474/24 |
| 2,153,151 | A | * | 4/1939 | Morella | F16H 9/12 474/24 |
| 2,182,507 | A | * | 12/1939 | Whitcomb | F16H 9/04 474/24 |
| 2,198,314 | A | * | 4/1940 | Morella | F16H 55/56 474/24 |
| 2,209,736 | A | * | 7/1940 | Livingston | F16H 55/56 474/33 |
| 2,253,612 | A | * | 8/1941 | Dow | F16H 55/566 474/8 |
| 2,257,744 | A | * | 10/1941 | Heyer | F16H 9/16 474/24 |
| 2,464,841 | A | * | 3/1949 | Alexander | F16H 9/16 474/33 |
| 4,177,687 | A | * | 12/1979 | Russ, Sr. | F16G 5/166 474/242 |
| 4,179,946 | A | * | 12/1979 | Kanstoroom | F16H 61/66245 474/13 |
| 4,395,248 | A | * | 7/1983 | Kern | F16H 9/24 474/152 |
| 4,525,160 | A | * | 6/1985 | Okawa | F16G 5/16 474/201 |
| 4,618,337 | A | * | 10/1986 | Okawa | F16G 5/16 474/201 |
| 4,643,703 | A | * | 2/1987 | Yasuda | F16G 5/18 474/201 |
| 4,718,881 | A | * | 1/1988 | Sugimoto | F16G 5/18 474/201 |
| 5,897,450 | A | * | 4/1999 | May | F16H 9/16 474/32 |
| 6,592,483 | B2 | * | 7/2003 | Markley | F16G 5/18 474/201 |
| 2002/0183144 | A1 | | 12/2002 | Crewe et al. | |
| 2015/0087453 | A1 | * | 3/2015 | Choi | F16H 7/08 474/8 |
| 2015/0105194 | A1 | * | 4/2015 | Sumida | F16G 5/16 474/28 |

FOREIGN PATENT DOCUMENTS

| | | |
|---|---|---|
| GB | 762990 A | 12/1956 |
| GB | 1 431 859 A | 4/1976 |
| GB | 2449916 A | 12/2008 |
| WO | WO 2014/171816 A1 | 10/2014 |

\* cited by examiner

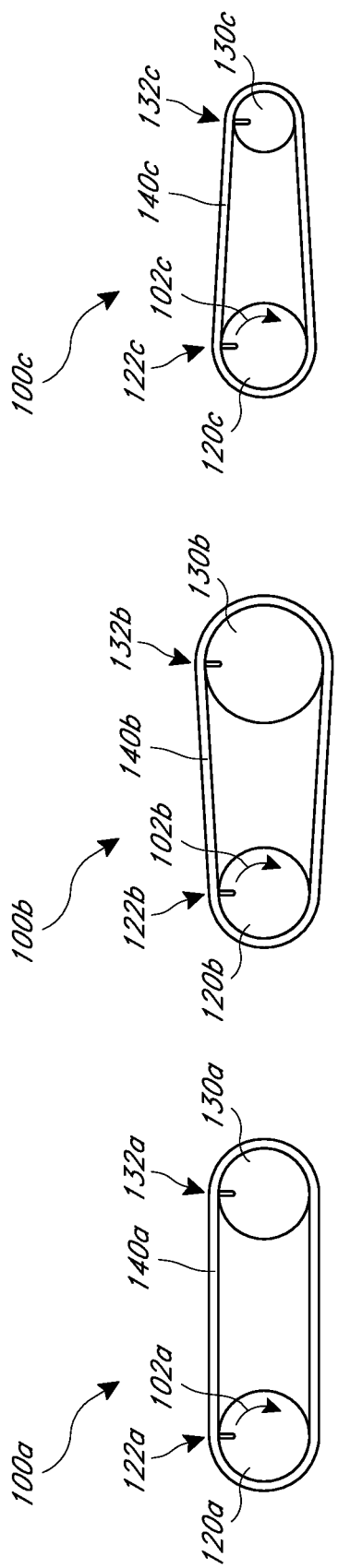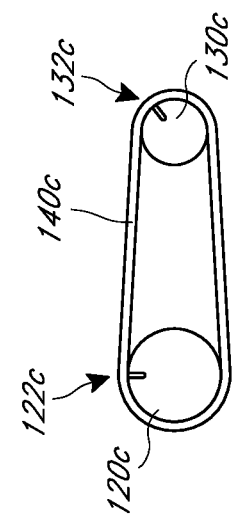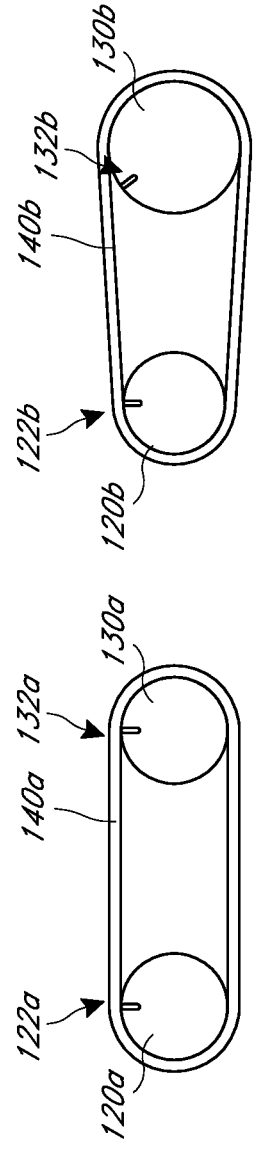

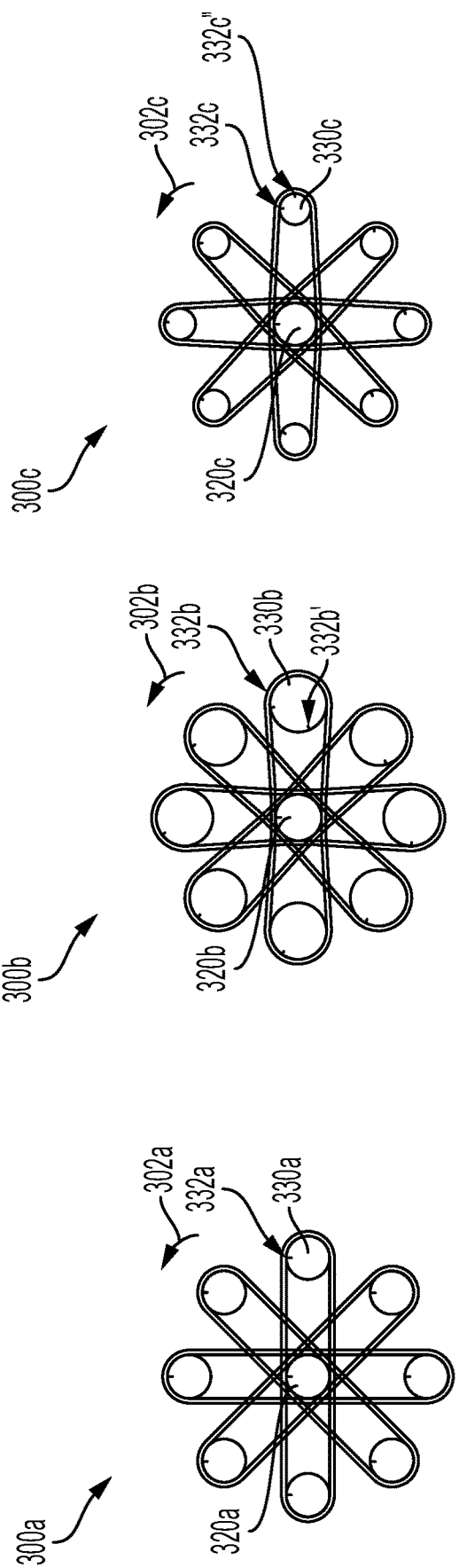

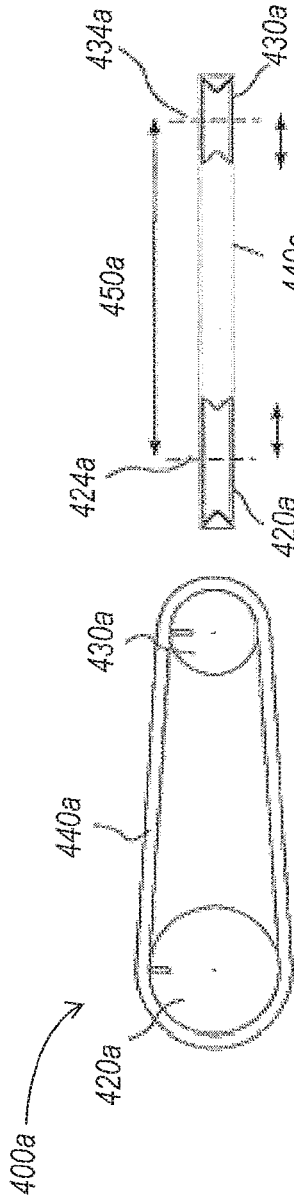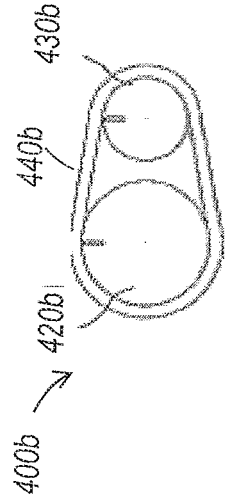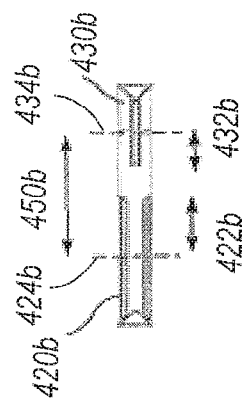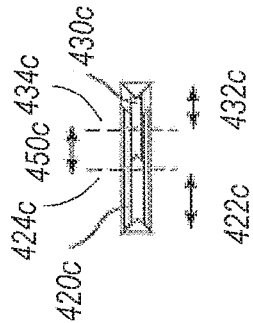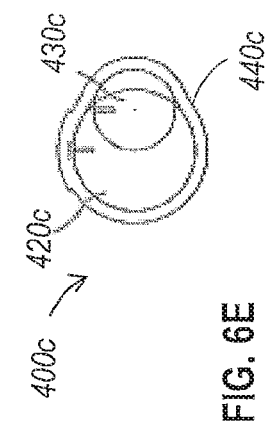

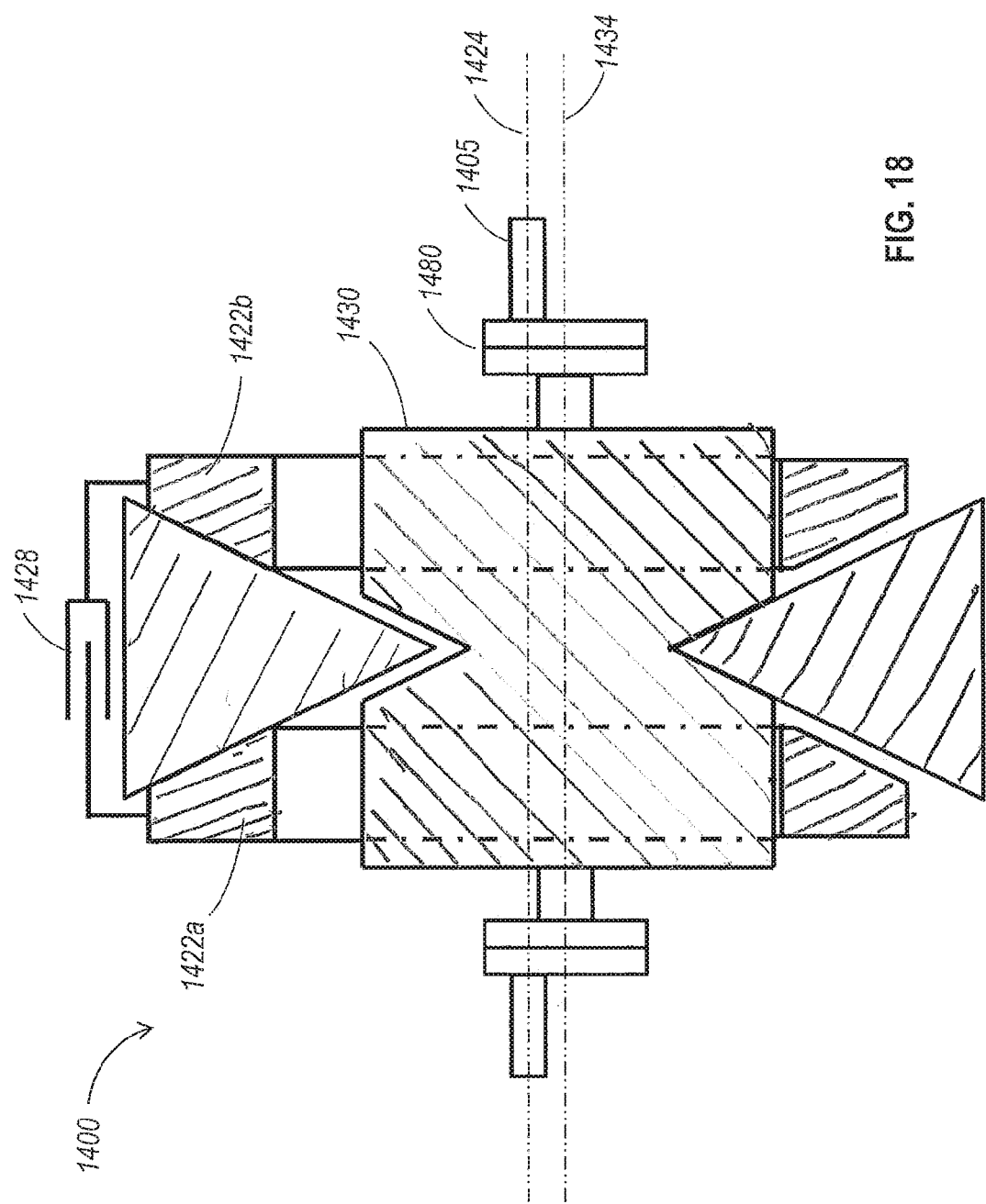

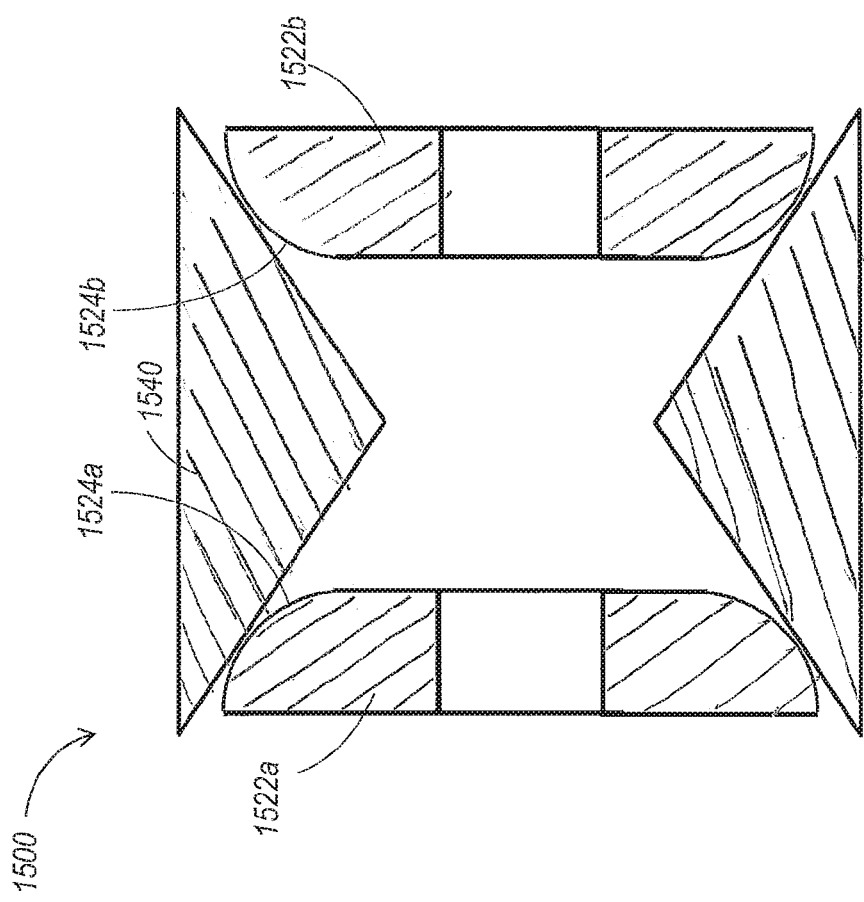

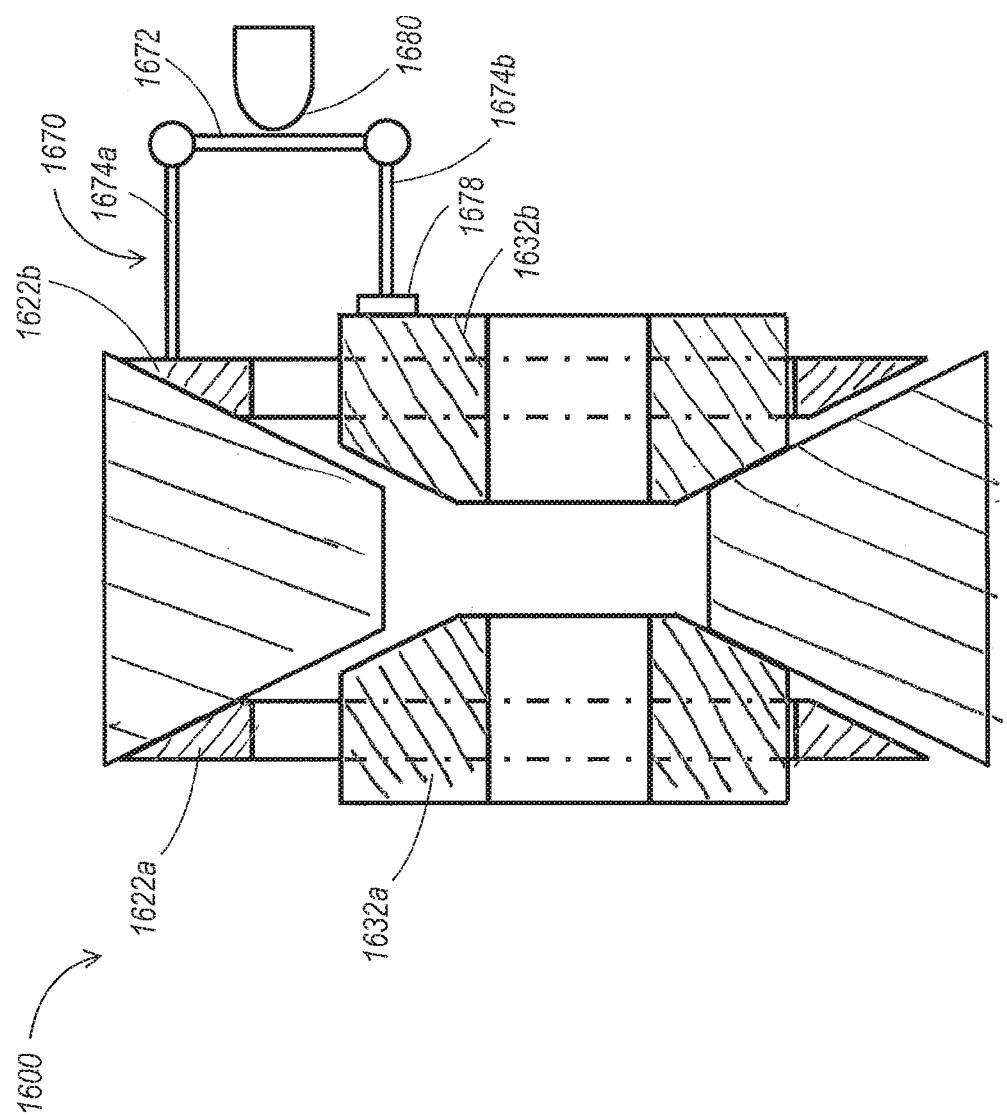

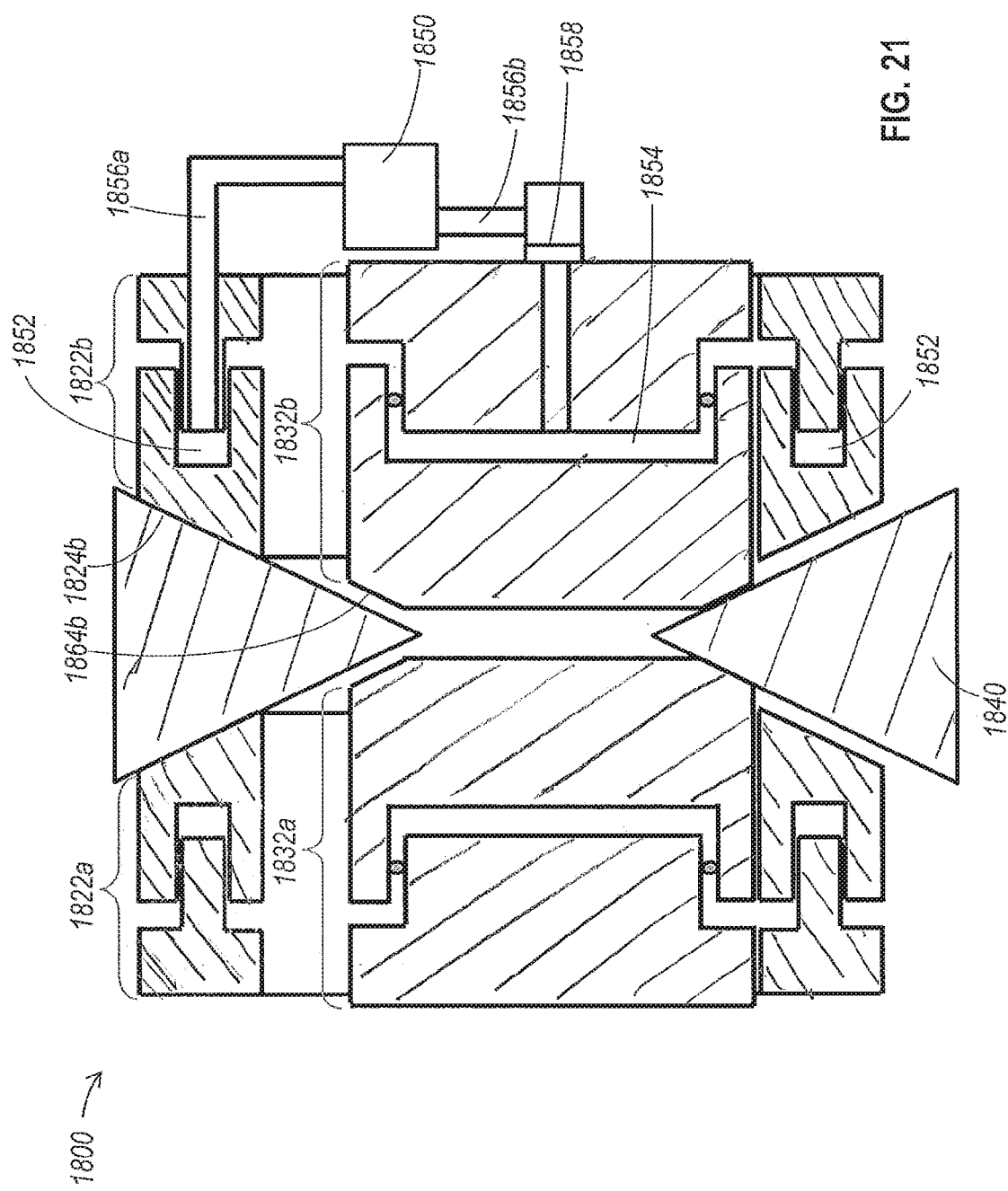

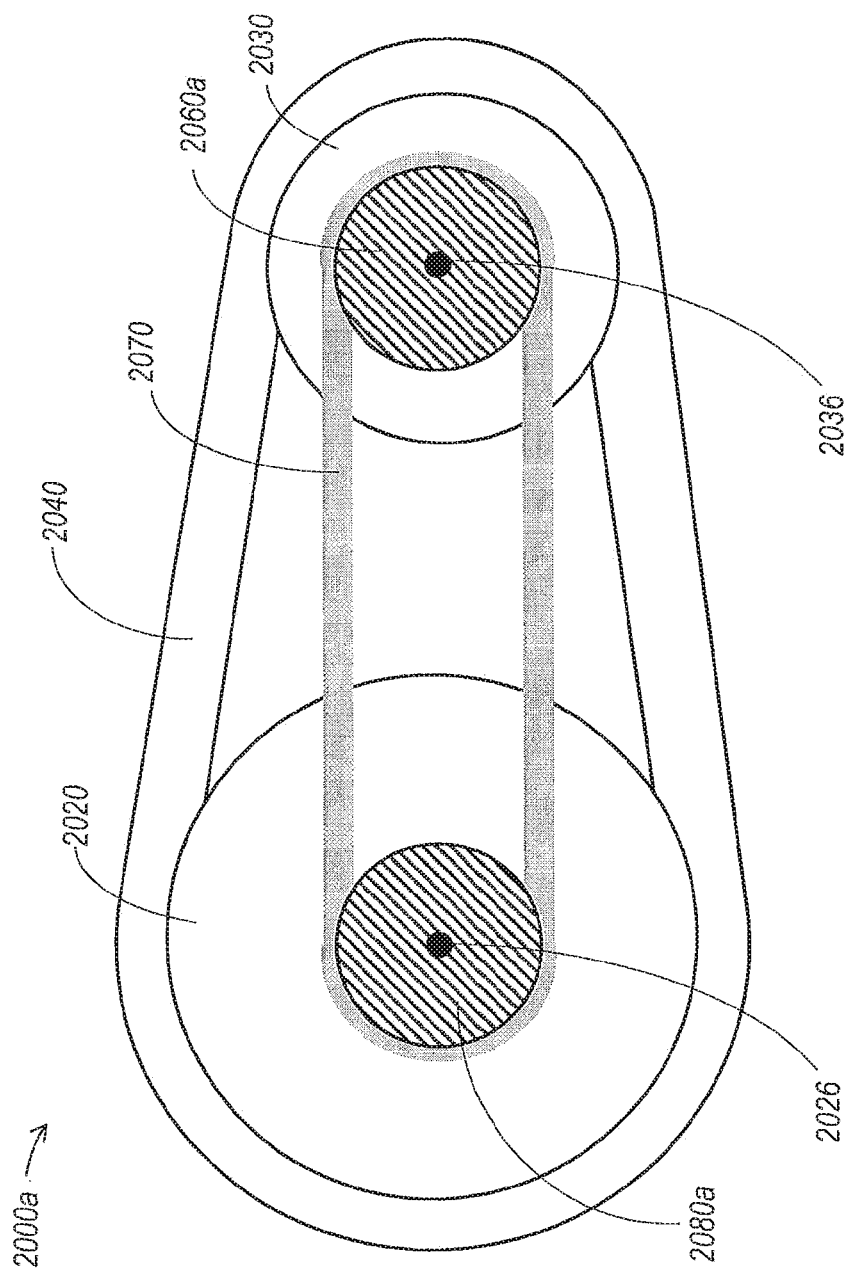

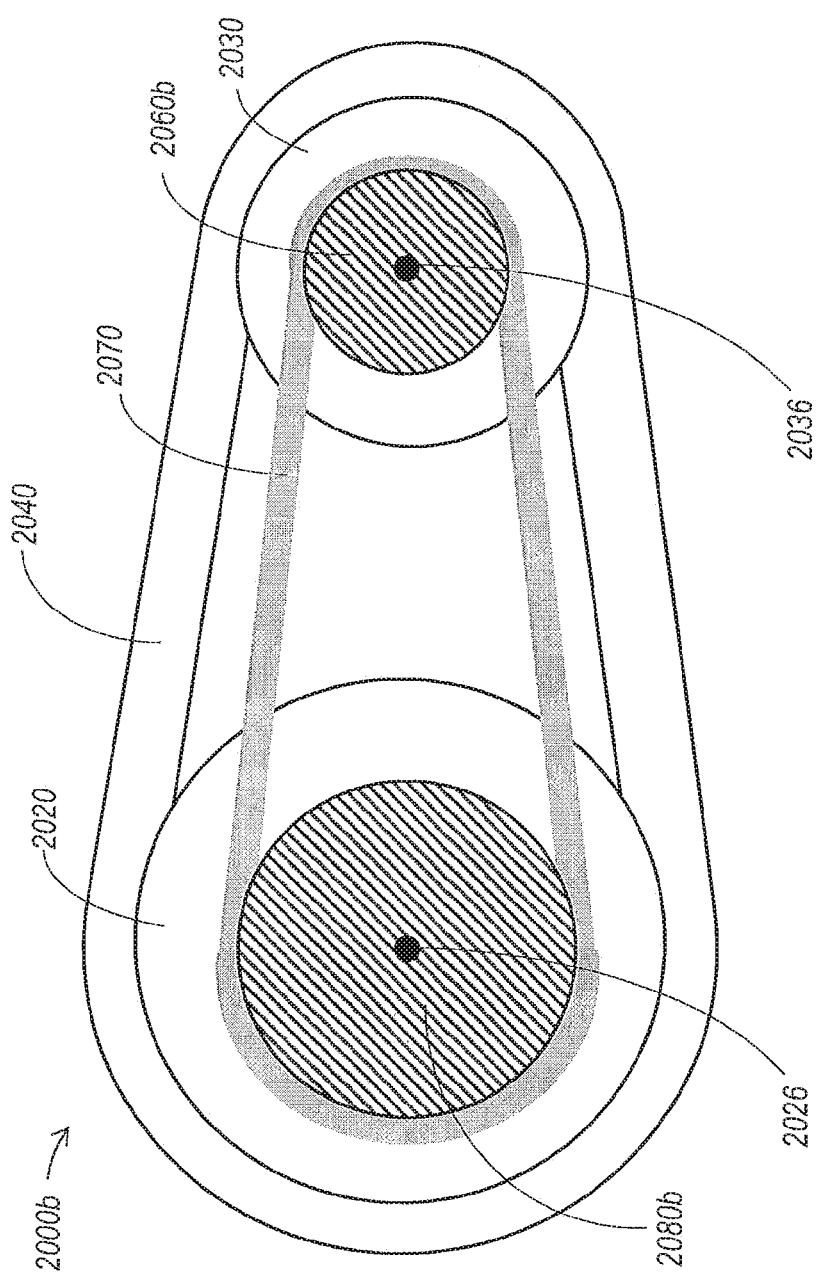

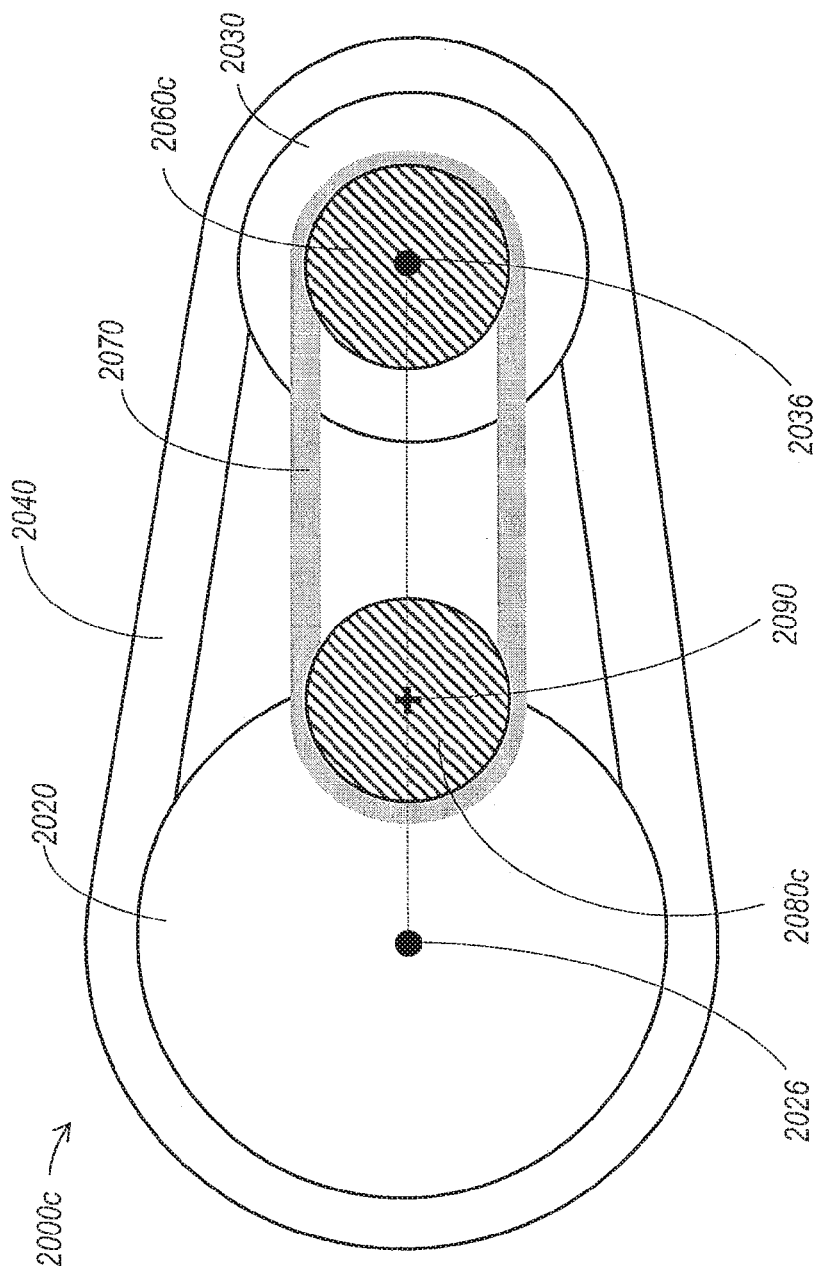

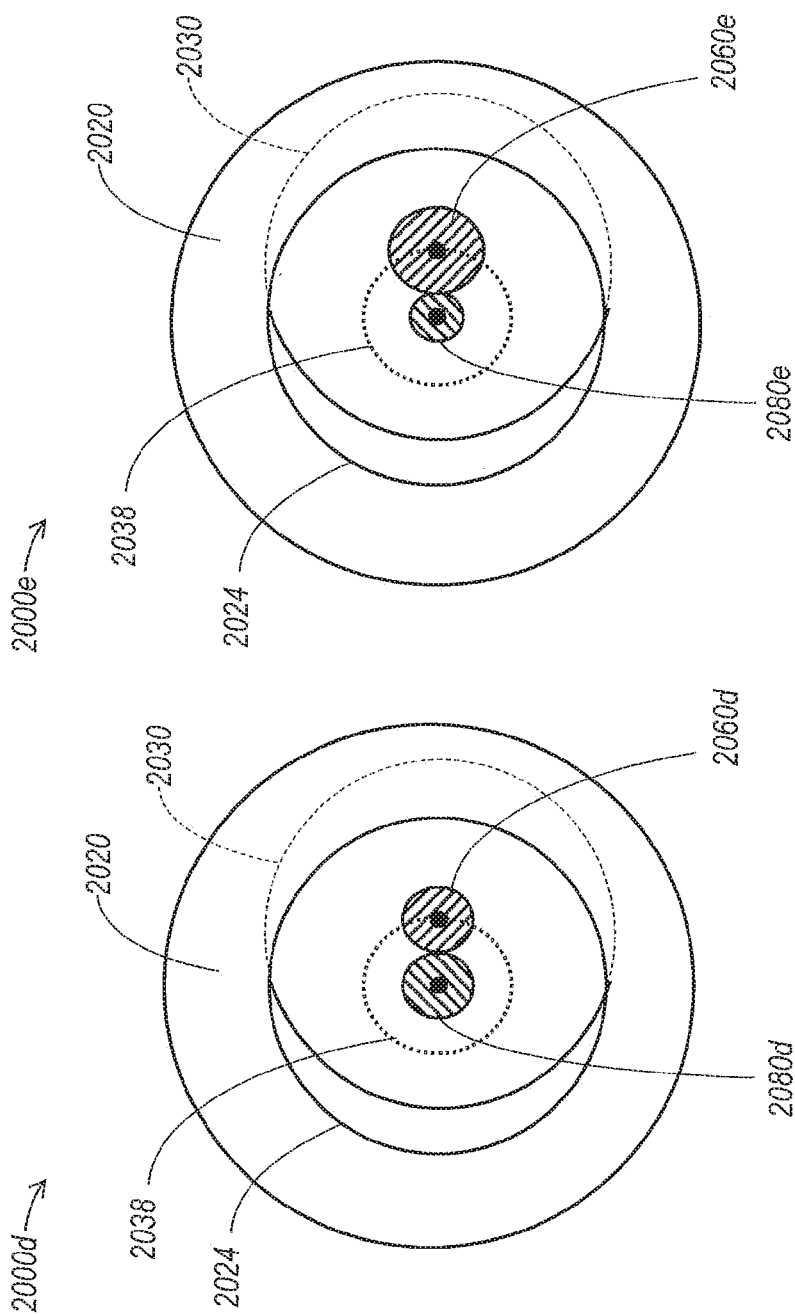

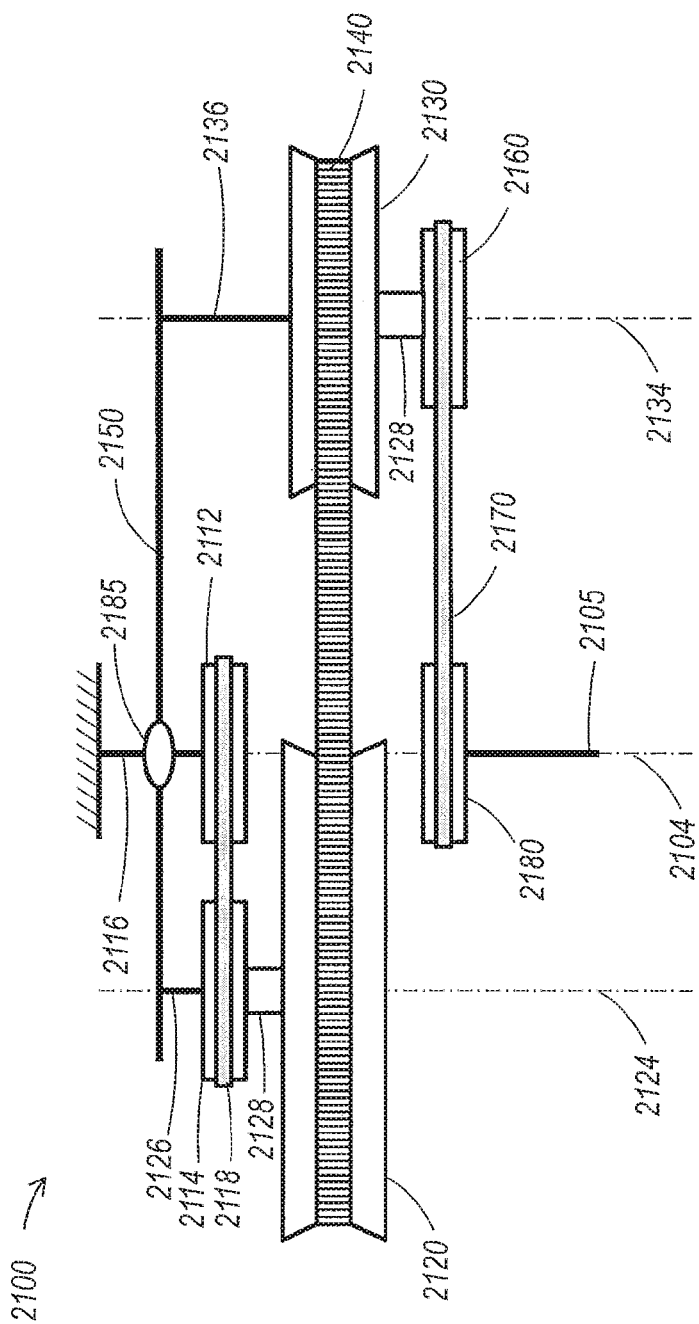

COMPACT INFINITELY VARIABLE TRANSMISSION

CROSS-REFERENCE TO RELATED APPLICATIONS; BENEFIT CLAIM

This application claims the benefit as a Continuation of application. Ser. No. PCT/US2017/015184, filed Jan. 26, 2017, which claims priority to 62/288,466 filed Jan. 29, 2016, the entire contents of which is hereby incorporated by reference as if fully set forth herein.

BACKGROUND

Technical Field

Embodiments described herein relate to transmissions, including continuously variable transmissions and infinitely variable transmissions.

SUMMARY

Certain embodiments described herein relate to a variable transmission including an outer pulley, the outer pulley including a first outer pulley segment, the first outer pulley segment including a contact surface, and a second outer pulley segment spaced apart from the first outer pulley segment by a first variable distance, the second outer pulley segment including a contact surface, an inner pulley, a portion of the inner pulley located between the first outer pulley segment and the second outer pulley segment, the inner pulley including a first inner pulley segment, the first inner pulley segment including a contact surface located axially and radially inward of the contact surface of the first outer pulley segment, and a second inner pulley segment spaced apart from the first inner pulley segment by a second variable distance, the second inner pulley segment including a contact surface located axially and radially inward of the contact surface of the second outer pulley segment, and a belt in contact with at least a portion of the contact surfaces of the first and second outer pulley segments and at least a portion of the contact surfaces of the first and second inner pulley segments.

In some embodiments, one of the outer and inner pulleys may be rotationally fixed. In some further embodiments, the outer pulley may be rotationally fixed, and the transmission may additionally include a shifting mechanism configured to move at least one of the first outer pulley segment and the second outer pulley segment relative to the other to control the first variable distance between the first outer pulley segment and the second outer pulley segment. In some still further embodiments, the transmission may additionally include a spring coupled to the first inner pulley segment and the second inner pulley segment to adjust the second variable distance between the first inner pulley segment and the second inner pulley segment in response to changes in the first variable distance between the first outer pulley segment and the second outer pulley segment.

In some embodiments, the belt may include a plurality of belt segments. In some embodiments, the belt includes a tension belt extending through each of the plurality of belt segments, and the facing surfaces of the belt segments include curved surfaces. In some embodiments, the belt includes a plurality of pins, each pin extending through at least a portion of each of two adjacent belt segments of the plurality of belt segments.

In some embodiments, the transmission additionally includes a hydraulic pump in fluid communication with a first fluid chamber, where a change in the size of the first fluid chamber alters one of the first variable distance or the second variable distance.

In some embodiments, both the inner and outer pulleys may be configured to orbit eccentrically about a rotational axis of the variable transmission. In some further embodiments, one of the outer pulley and the inner pulley may be rotationally fixed. In some still further embodiments, the rotationally fixed pulley may be coupled to a plurality of eccentric cams.

In some embodiments, the transmission may additionally include an output structure configured to transmit the rotational output of an eccentrically orbiting pulley to a rotating output member configured to rotate with less eccentricity than the eccentrically orbiting pulley. In some further embodiments, the output structure may include a fixed-ratio transmission.

Other embodiments described herein relate to a transmission, including a first segmented pulley section, the first segmented pulley section including a contact surface oriented at a first angle to an axis of rotation of the first segmented pulley section, a second segmented pulley section, the second segmented pulley section including an angled contact surface oriented at a second angle to an axis of rotation of the first segmented pulley section, a nested pulley at least partially disposed between the first segmented pulley section and the second segmented pulley section, the nested pulley including a first contact surface oriented at the same angle to an axis of rotation of the nested pulley as the first angle, and a second contact surface oriented at the same angle to the axis of rotation of the nested pulley as the second angle, and a belt extending around at least a portion of the nested pulley and the first and second segmented pulley sections.

In some embodiments, the first segmented pulley section and the second segmented pulley section may be separated from one another by a first distance, and the transmission may additionally include an actuator configured to alter the first distance between the first segmented pulley section and the second segmented pulley section to change a transmission ratio of the transmission. In some further embodiments, the actuator may include a hydraulic pump in fluid communication with a fluid chamber, and where a change in the size of the fluid chamber alters the first distance between the first segmented pulley section and the second segmented pulley section. In some other further embodiments, the actuator may include a servo coupled to the first segmented pulley section.

In some embodiments, the first and second segmented pulley sections may be rotationally fixed, and the nested pulley may be configured to orbit eccentrically about a rotational axis of the transmission. In some further embodiments, the transmission may additionally include an input shaft coupled to an eccentric cam, the eccentric cam coupled to the nested pulley and configured to cause the nested pulley to orbit eccentrically about the rotational axis of the transmission in response to rotation of the input shaft. In some other further embodiments, the transmission may additionally include a rotational harvester coupled to the nested pulley, where the rotational harvester transmits rotational output of the nested pulley to an output of the transmission aligned with a longitudinal axis of the transmission.

In some embodiments, the nested pulley includes a first nested pulley segment including the first contact surface, and a second nested pulley segment spaced apart from the first nested pulley segment by a variable distance and including the second contact surface. In some further embodiments, the transmission additionally includes a spring biasing the first nested pulley segment towards the second nested pulley segment.

Other embodiments described herein relate to a variable transmission, including a first pulley having a maximum diameter and a variable effective diameter, the first pulley being rotationally fixed, a second pulley having a maximum diameter and a variable effective diameter, the second pulley configured to orbit around a rotational axis of the variable transmission, and a belt in contact with at least a portion of the first pulley and the second pulley, a largest dimension of the IVT being less than the sum of the maximum diameters of the first and second pulleys.

In some embodiments, the belt may be configured for operation as a push-belt. In some embodiments, the first pulley may be configured to orbit around the rotational axis of the variable transmission. In some embodiments, the first pulley may be centered about the rotational axis of the variable transmission.

In some embodiments, the variable effective diameter of the first pulley may be variable over a first range and the variable effective diameter of the second pulley may be variable over a second range, the first range at least partially overlapping with the second range. In some embodiments, the first pulley may include a first pulley segment and a second pulley segment, and the second pulley may be disposed at least partially between the first and second pulley segments of the first pulley. In some embodiments, the second pulley may include a first pulley segment and a second pulley segment, and the first pulley may be disposed at least partially between the first and second pulley segments of the second pulley.

BRIEF DESCRIPTION OF THE DRAWINGS

FIGS. 2A-2F schematically illustrate the operation of CVTs such as the CVT of FIG. 1 in various configurations.

FIGS. 5A-5C schematically illustrate the operation of an IVT such as the IVT of FIG. 4 in various configurations.

FIGS. 6A-6F schematically illustrate multiple embodiments of variable transmissions, illustrating the reduction in eccentricity that can be achieved by at least partially nesting pulleys within one another.

FIG. 18 shows an embodiment of a variable transmission in which one of the pulleys has a fixed effective diameter.

FIG. 19 schematically illustrates the use of a curved contact surface between a pulley and a belt.

FIG. 20 is another embodiment of a variable transmission in which a single mechanism can be used to control the transmission ratio of the device.

FIG. 21 schematically illustrates an embodiment of a variable transmission including two hydraulically controlled segmented pulleys.

FIG. 23A schematically illustrates one embodiment of a variable transmission in which the eccentricity of the rotational output of an eccentrically orbiting pulley is eliminated.

FIG. 23B schematically illustrates another embodiment of a variable transmission in which the eccentricity of the rotational output of an eccentrically orbiting pulley is eliminated.

FIG. 23C schematically illustrates another embodiment of a variable transmission in which the eccentricity of the rotational output of an eccentrically orbiting pulley is eliminated.

FIG. 23D schematically illustrates an embodiment of a nested variable transmission in which the eccentricity of the rotational output of an eccentrically orbiting pulley is eliminated.

FIG. 23E schematically illustrates another embodiment of a nested variable transmission in which the eccentricity of the rotational output of an eccentrically orbiting pulley is eliminated.

FIG. 24 is a top plan view of an embodiment of a variable transmission in which two pulleys are configured to orbit around a rotational axis of the variable transmission.

DETAILED DESCRIPTION

Transmissions may be used in a wide variety of applications, including robotics, automotive, and industrial applications, among others. The particular transmission design and configuration utilized in a given application will be dependent on design constraints required or useful in the particular application. By way of example, transmissions for use in complex robotic applications may require minimal backlash, as well as durability over a great number of repetitions of similar movements. Robots or other mechanized components designed for human interaction may have particular safety requirements, as well, to prevent harm or injury to the humans interacting with the robot.

For applications that require a wide range of operating speeds, such as robotic, automotive, and industrial applications, the use of a variable transmission may provide advantages in efficiency over a fixed transmission. A fixed transmission ratio may be optimized for a small range of output speeds, allowing a motor to operate within a highly efficient speed band. For example, an electric motor may be 90% efficient or higher when operating under high velocity and low torque. However, an application which requires a wide range of output speeds will introduce substantial inefficiency and losses within the motor when the motor is operating at speeds or under loads outside of the range of peak efficiency.

In applications which allow some flexibility with respect to the size and weight of the transmission, variable transmissions may be used to alleviate some of the inefficiency caused by operation over a wide range of speeds. However, many embodiments of variable transmissions are larger and/or heavier than a fixed transmission, and the size and weight requirements of some applications, such as in robotics, may limit or prevent the use of certain transmission designs.

Figure 1:
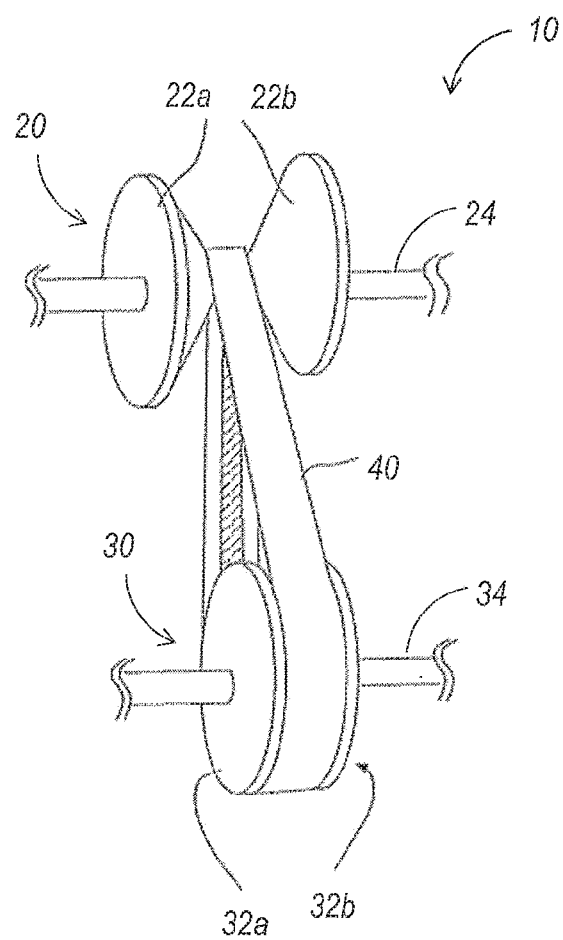
FIG. 1 is a perspective view of a transmission configured for operation as continuously variable transmission (CVT).

FIG. 1 is a perspective view of a continuously variable transmission (CVT). The CVT 10 includes a first pulley 20 including a first pair of facing conical structures 22a and 22b configured to rotate together around an axis aligned with a first shaft (or shafts) 24, and a second pulley 30 including a second pair of facing conical structures 32a and 32b configured to rotate together around an axis aligned with a second shaft (or shafts) 32. A belt 40 having angled contact surfaces extends around each of the first pulley and the second pulley. The belt 40 may be a V-shaped belt having a triangular cross-section, although any suitable cross-sectional shape which provides angled contact surfaces for contact with the pulleys 20 and 30 may be used. The angles of the angled contact surfaces may match the angles at which the facing surfaces of the conical structures of the pulleys 20 and 30 are oriented, in order to increase or maximize the contact area between the belt 40 and the pulleys 20 and 30.

The rotation of one of the pulleys about its corresponding axis may be the input or driving pulley of the CVT 10, and the rotation of the other one of the pulleys about its corresponding axis may be the output or driven pulley of the CVT 10. The transmission ratio of the CVT is a function of the effective diameters of the pulleys 20 and 30, which in turn is dependent on the point at which the belt 40 contacts the pulleys 20 and 30, as discussed in greater detail elsewhere herein. The effective diameter of a pulley may also be referred to as the pitch diameter of the pulley, or as the effective pitch diameter of the pulley. The transmission ratio of the CVT 10 may be varied by adjusting the spacing between the conical structures of at least one of the first or second pulleys 20 and 30. Doing so changes the effective diameter of the pulley, altering the transmission ratio of the CVT 10.

In some embodiments, the spacing between the conical structures of the pulleys 20 and 30 may be independently controllable. However, even in such embodiments, the effective diameter of one pulley may be reduced as another is increased in order to maintain a similar or constant belt length. Independent control of the effective diameters of the pulleys 20 and 30 allows the tension within the belt 40 to be controlled, as well.

By changing the distance between the conical structures of each pulley independently, various transmission ratios for the CVT 10 can be obtained. For example, if the distance between the cones for the input pulley is larger than the distance between the cones for the output pulley, so that the effective diameter of the input pulley is smaller than the effective diameter of the output pulley, the CVT 10 will provide a transmission ratio greater than 1. The transmission ratio of the CVT 10 may be defined as a ratio of the input speed to the output speed ($W$ in/$W$ out), so that a transmission ratio greater than 1 indicates that the input pulley rotates faster than the output pulley.

FIGS. 2A-2F schematically illustrate the operation of CVTs such as the CVT of FIG. 1. In the CVT 100a of FIG. 2A, the driving pulley 120a and the driven pulley 130a have the same effective diameter. Driving pulley 120a is configured to be rotated in a clockwise direction, as shown by arrow 102a. As can be seen in FIGS. 2A and 2B by the locations of marker 122a on pulley 120a and marker 132a on pulley 130a, one complete rotation of driving pulley 120a in the clockwise direction of arrow 102a will result in one complete rotation of driven pulley 130a in the clockwise direction. Thus, when pulleys 120a and 130a have the same effective diameter, the transmission ratio of the CVT 100a will be 1.

In the CVT 100b of FIG. 2C, the driving pulley 120b has a smaller effective diameter than the driven pulley 130b. Driving pulley 120b is configured to be rotated in a clockwise direction, as shown by arrow 102b. As can be seen in FIGS. 2C and 2D by the locations of marker 122b on pulley 120b and marker 132b on pulley 130b, one complete rotation of driving pulley 120b in the clockwise direction of arrow 102b will result in less than one complete rotation of driven pulley 130b in the clockwise direction. Thus, when the driving pulley 120b has a smaller effective diameter than the driven pulley 130b, the transmission ratio of the CVT 100b will be greater than 1, as the driving pulley 120b will rotate faster than the driven pulley 120b.

In the CVT 100c of FIG. 2E, the driving pulley 120c has a larger effective diameter than the driven pulley 130c. Driving pulley 120c is configured to be rotated in a clockwise direction, as shown by arrow 102c. As can be seen in FIGS. 2E and 2F by the locations of marker 122c on pulley 120c and marker 132c on pulley 130c, one complete rotation of driving pulley 120c in the clockwise direction of arrow 102c will result in more than one complete rotation of driven pulley 130c in the clockwise direction. Thus, when the driving pulley 120c has a larger effective diameter than the driven pulley 130c, the transmission ratio of the CVT 100c will be less than 1, as the driving pulley 120c will rotate more slowly than the driven pulley 120c.

In some embodiments, the transmission ratios for a given CVT range from 0.33 to 3, centered about the 1 ratio where both pulleys have the same effective diameter. Such transmissions, or similar transmissions, may be used in the automotive industry to provide a variable transmission, with an additional gear and clutches for reverse. While such transmission ratio ranges may be typical for certain applications, CVTs may be configured or designed to provide other transmission ratio ranges in other embodiments.

Figures 3A, 3B, 3C:
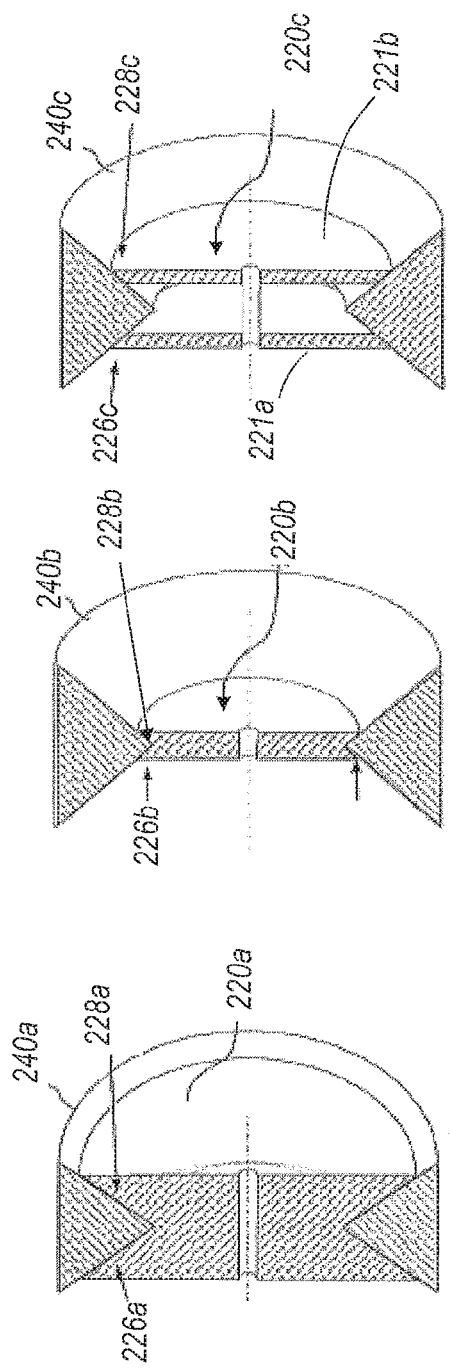
FIGS. 3A-3C illustrate cross-sections of a V-belt over various pulley configurations.

FIGS. 3A-3C illustrate cross-sections of a V-belt over various pulley configurations. In FIG. 3A, the pulley 220a includes contact surfaces 226a and 228b within a V-shaped groove in the outer surface of the pulley 220a. The V-shaped groove within the pulley 220*a* is nearly as deep as the height of the V-belt 240 seated within the groove of the pulley 220*a*. As the V-shaped groove extends the entire width of the pulley 220*a*, the diameter of the pulley at its largest point is nearly as large as the spacing between the uppermost and lowermost sections of the belt 240 wrapped over the pulley 220*a*.

In FIG. 3B, the pulley 220*b* similarly includes contact surfaces 226*b* and 228*b* within a V-shaped groove in the outer surface of the pulley 220*b*. However, the V-shaped groove in the outer surface of the pulley 220*b* is shallower than the V-shaped groove, and the contact surfaces 226*b* and 228*b* are accordingly smaller. The physical diameter (the largest dimetral dimension of the part) of the pulley at its largest point is much smaller than the physical diameter of the pulley 220*a* of FIG. 3A at its largest point. Nevertheless, the spacing between the outermost sections of the belt 240 where it is wrapped over the pulley is the same as the spacing of the outermost sections of the belt 240 in FIG. 3A.

In FIG. 3C, the pulley 220*c* is a segmented pulley which has been segmented into multiple components along a plan orthogonal to the axis of the pulley. In the illustrated embodiment, the pulley 220*c* includes two separate halves 221*a* and 221*b*, each of which includes a contact surface 226*c* and 228*c*, respectively. While segmented, the two halves 221*a* and 221*b* rotate in unison. The diameter of the pulley 220*c* at its largest point is larger than the largest diameter of the pulley 220*b*, but smaller than the diameter of the pulley 220*a*. Again, in the illustrated embodiments, the outermost spacing between the segments of the belt 240 where it is wrapped over the pulley is the same as the outermost spacing of the segments of the belt 240 in FIGS. 3A and 3B. In other embodiments, other variations on the size and shape of the belt segments and the placement of the belt tension elements may be used.

Despite the differences in diameters of the pulleys themselves, the belt 240 assumes the same shape when wrapped around each of the pulleys of FIGS. 3A-3C. Thus, the belt diameter or effective diameter of each of the pulleys of FIGS. 3A-3C is identical, despite their significantly different shapes, as the contact surfaces of each of these pulleys are arranged along and include different sections of the same V-shape. Thus, various pulley diameters and form factors can provide the same belt diameter or effective pulley diameter.

However, the use of a variable segmented pulley can also provide different belt diameters or effective pulley diameters by reconfiguring the same structure. By adjusting the distance between the segments of a segmented pulley, given a fixed belt length, the belt diameter around the adjustable pulley changes, affecting the gear ratio or transmission ratio of a transmission including the variable segmented pulley.

Figure 3D:
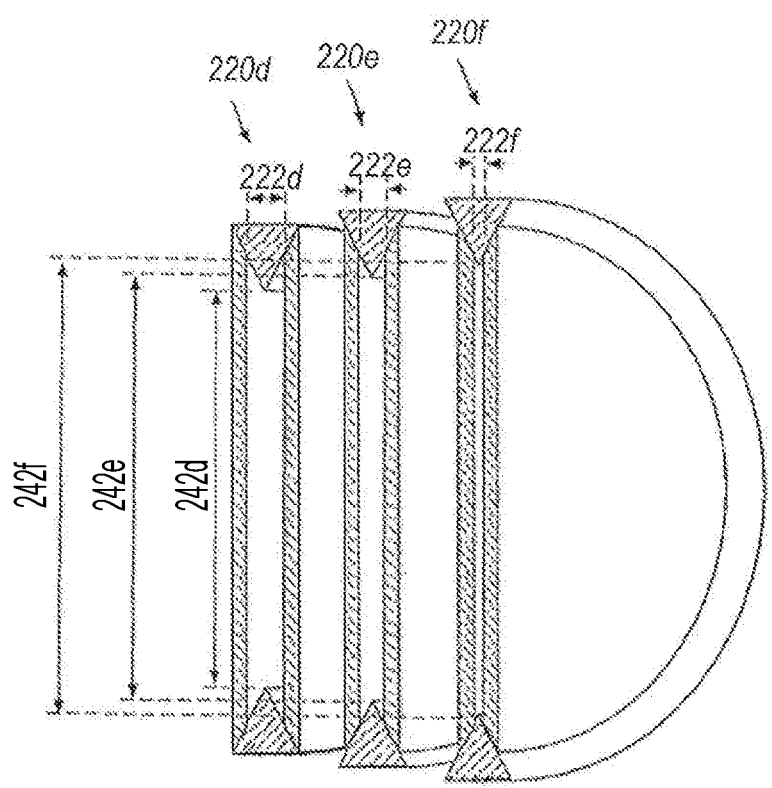
FIG. 3D is a perspective cross-section illustrating three different configurations of otherwise identical segmented pulleys, and the effect of those configurations on the effective diameter or belt diameter of those pulleys.

FIG. 3D is a perspective cross-section illustrating three different configurations of otherwise identical segmented pulleys, and the effect of those configurations on the effective diameter or belt diameter of those pulleys. FIG. 3D shows three different pulleys 220*d*, 220*e*, and 220*g*, each including a pair of pulley segments with the segments of the different pulleys spaced at different distances from one another, and each supporting an identical V-belt 240. The segments of the first pulley 220*d* are spaced the largest distance 222*d* from one another of any of the three pulleys, and the resulting belt diameter 242*d* is the smallest of the three pulley configurations. In contrast, the segments of the third pulley 220*f* are spaced the largest distance 222*f* from one another of any of the three pulleys, and the resulting belt diameter 242*f* is the smallest of the three pulley configurations. The segment spacing 222*e* and corresponding belt diameter 242*e* of the second pulley 220*e* are between those of the first pulley 220*d* and third pulley 220*f* By increasing the spacing between the segments of a segmented pulley, the effective diameter of the pulley can be reduced.

Figure 4:
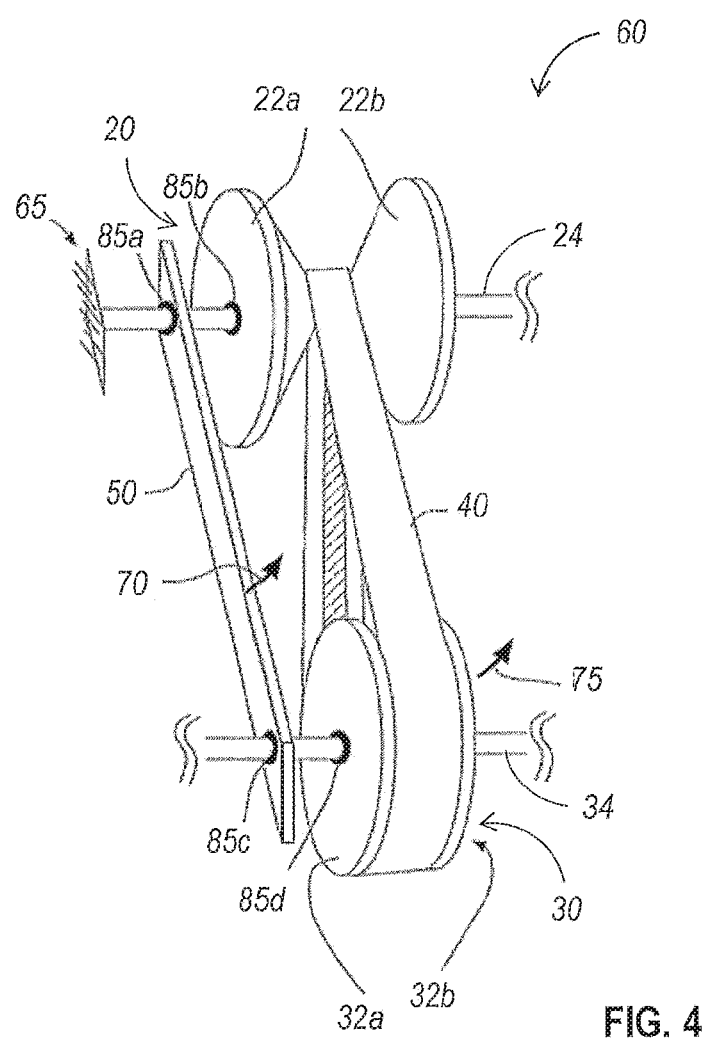
FIG. 4 is a perspective view of a transmission, similar to the transmission of FIG. 1, configured for operation as an infinitely variable transmission (IVT).

In some embodiments, a structure similar to the structure of the CVT in FIG. 1 may be configured for operating as an infinitely variable transmission, rather than a continuously variable transmission. FIG. 4 is a perspective view of a transmission, similar to the transmission of FIG. 1, configured for operation as an infinitely variable transmission (IVT). The IVT 60 of FIG. 4 differs from the CVT 10 of FIG. 1 at least in that the pulley 20 is rotationally fixed, as schematically illustrated by mechanical ground 65, so that the pulley 20 is prevented from rotation about an axis aligned with shaft 24. For example, a linear bearing 85*b* may be used to couple at least one of the sections of the pulley 20 to the shaft 24, allowing translation along the shaft 24 without permitting rotation of the pulley 20 around the shaft 24.

At least one mechanical connector 50 may be used to maintain a constant spacing between the shaft 24 of pulley 20 and the shaft 34 of pulley 30. Bearing 85*a* between the connector 50 and the shaft 24 and bearing 85*c* between the connector 50 and the shaft 34 allow orbiting of the shaft 34 and associated pulley 30 around the shaft 24 and associated pulley at a distance defined by the spacing between the points at which the shafts 24 and 34 pass through the connector 50. In addition, the non-grounded pulley 30 is allowed to rotate around an axis aligned with shaft 34. In the illustrated embodiment, bearing 85*d* disposed between the shaft 34 and the pulley 30 allows this rotation, although other suitable structures may be utilized in other embodiments.

In some embodiments, an input torque may be applied to the connector 50 in the direction shown by arrow 70, inducing orbiting of the pulley 30 relative to the pulley 20 in the direction shown by arrow 75. The orbit of the pulley 30 relative to the pulley 20 may serve as the input for the IVT 60. As the pulley 30 orbits around the pulley 20, the belt 40 will rotate around the pulley 30 and the movement of the belt 40 will induce rotation of the pulley 30 about an axis aligned with shaft 34. Thus, when the orbit of the pulley 30 relative to the pulley 20 serves as the input for the IVT 60, the rotation of the pulley 30 will serve as the output of the IVT 60. The rate of rotation of the pulley 30 relative to the rate of orbiting of the pulley 30 about the pulley 20 will be dependent upon the effective diameters of the pulleys 20 and 30.

When the pulleys 20 and 30 have the same effective diameter, the ratio of input velocity to output velocity is infinite ($W$in/$W$out=<$W$in/0), as rotation of the connector 50 at any speed will not result in rotation of the pulley 30 relative to the shaft 34, and the output will not move. Conversely, the system is not back-drivable in a configuration where the pulleys 20 and 30 have the same effective diameter, and the system therefore requires no torque to sustain a given position. When one of the pulleys has a larger effective diameter than the other, a forward drive is achieved, and when their effective diameters are reversed, the drive direction is reversed as well.

FIGS. 5A-5C schematically illustrate the operation of an IVT in various configurations. In particular, FIG. 5A schematically illustrates the relative positions of a pulley 330*a*, where the input of the IVT 300*a* drives the pulley 330*a* to orbit around a rotationally fixed pulley 320*a* in the direction shown by arrow 302*a*. The pulley 330*a* may be supported by an eccentric shaft coaxial with a shaft supporting pulley 320*a*, as described with respect to FIG. 4. In the IVT 300*a* of FIG. 4, the pulleys 330*a* and 320*a* have the same effective diameter. As the pulley 320*a* is rotationally fixed, the marker 322*a* on the pulley 320*a* remains at the same location regardless of the position of the orbiting pulley 330*a*, and there is no relative rotation of the pulley 330*a* relative to the pulley 320*a*. In addition, as the effective diameters of the pulleys 320*a* and 330*a* are the same, the location of the marker 322*a* on the orbiting pulley 330*a* remains the same as the pulley 330*a* orbits around the pulley 320*a*. The ratio of the orbiting speed of the pulley 330*a* to the rotational speed of the pulley 330*a* is therefore infinite in the configuration of IVT 300*a*, when the effective diameters of the pulleys 320*a* and 330*a* are equal.

FIG. 5B schematically illustrates the relative positions of a pulley 330*b* orbiting around a rotationally fixed pulley 320*b* in the direction shown by arrow 302*b*. In the IVT 300*b* of FIG. 4B, the orbiting pulley 330*b* has an effective diameter which is larger than the effective diameter of the rotationally fixed pulley 320*b*. As the pulley 320*b* is rotationally fixed, the marker 322*b* on the pulley 320*b* remains at the same location regardless of the position of the orbiting pulley 330*b*. However, the position of the marker 332*b* on the orbiting pulley 330*b* rotates the orbiting pulley 330*b* completes a full orbit around the fixed pulley 320*a*, rotating more than a quarter turn in the same counter-clockwise direction that the pulley 330*b* orbits, and ending at the location shown by marker 332*b*'. The ratio of the orbiting speed of the pulley of the pulley 330*b* to the rotational speed of the pulley 330*b* is positive in the configuration of IVT 300*b*, when the effective diameter of the pulley 320*b* is smaller than the effective diameter of the pulley 330*b*.

FIG. 5C schematically illustrates the relative positions of a pulley 330*c* orbiting around a rotationally fixed pulley 320*c* in the direction shown by arrow 302*c*. In the IVT 300*c* of FIG. 4C, the orbiting pulley 330*c* has an effective diameter which is smaller than the effective diameter of the rotationally fixed pulley 320*c*. As the pulley 320*c* is rotationally fixed, the marker 322*c* on the pulley 320*c* remains at the same location regardless of the position of the orbiting pulley 330*c*. However, the position of the marker 332*c* on the orbiting pulley 330*c* rotates as the orbiting pulley 330*c* completes a full orbit around the fixed pulley 320*c*, rotating roughly a quarter turn in a clockwise direction opposite the counter-clockwise direct that the pulley 330*c* orbits, and ending at the location shown by marker 332*c*'. The ratio of the orbiting speed of the pulley of the pulley 330*c* to the rotational speed of the pulley 330*c* is negative in the configuration of IVT 300*c*, when the effective diameter of the pulley 320*c* is larger than the effective diameter of the pulley 330*c*.

Thus, in IVT such as the IVT of FIG. 4, the output depends on the difference in the diameters of the two pulleys. Because of this, the IVT can achieve forward gearing, reverse gearing, and an infinite gear ratio. In contrast, the output of a CVT such as the CVT of FIG. 1 depends on the ratio of the diameters, rather than the difference, and additional gearing is required to reverse the input.

An additional distinction between the CVT configuration of FIG. 1 and the IVT configuration of FIG. 4 is that the IVT configuration has an eccentric output, due to the orbiting of at least one of the two pulleys. In addition, the eccentric mass of the system due to the orbiting of the pulleys means that the system has an unbalanced inertia, also referred to as wobble inertia. The eccentricity of the output can be compensated for using any of a variety of suitable mechanisms to reduce or eliminate the eccentricity. For example, a linkage may be added to transmit the rotation of the orbiting pulley to a rotating structure aligned with the axis of the rotationally-grounded pulley or a different center of rotation of the system, if the center of rotation is disposed between the two pulleys. In other embodiments, an Oldham coupling or similar structure may be used to compensate for the eccentricity of the output.

While the CVT of FIG. 1 and the IVT of FIG. 4 can provide variable transmission ratios, the area occupied by the CVT and IVT may be large compared to the area occupied by fixed transmissions. For example, the area occupied by a CVT such as CVT 10 of FIG. 1 will be at least as long as the combined maximum diameters of the two pulleys, and at least as tall as the maximum diameter of the pulleys, and additional space may be needed to accommodate the belt and additional spacing between the pulleys, if desired.

The area occupied by an IVT such as the IVT 60 of FIG. 4 may be even larger than the area occupied by a CVT utilizing similar components, as space is required for the orbiting of one of the pulleys around the other. If one pulley is grounded, the volume occupied by the IVT is a cylindrical shape with a diameter that must be equal or greater than the combined maximum diameter of the grounded pulley and twice the maximum diameter of the orbiting pulley. Even if the IVT design were modified such that the pulleys orbit one around a point midway between the two pulleys, the diameter of the cylindrical volume will be equal or greater than the combined maximum diameter of the two pulleys.

Thus, while a variable transmission such as the CVT and IVT discussed above may offer benefits in terms of increased efficiency and reduced losses, the tradeoff in terms of the space required for operation of the variable transmission may make such variable transmission designs unsuitable for certain embodiments in which space is at a premium.

In some embodiments, however, the pulleys of a variable transmission may be at least partially nested within one another, with a segmented outer pulley configured to rotate within a first space and an inner pulley configured to rotate within a second space at least partially overlapping the first space within which the segmented outer pulley rotates.

FIGS. 6A-6F schematically illustrate multiple embodiments of variable transmissions, demonstrating the reduction in eccentricity that can be achieved by at least partially nesting pulleys within one another. FIG. 6A is a side view of a variable transmission 400*a* with the pulleys spaced a significant distance apart from one another, and FIG. 6B is a top view of the variable transmission of FIG. 6A. The first pulley 420*a* has a radius 422*a* and is centered on an orthogonally extending axis 424*a*, and the second pulley 430*a* has a radius 432*a* and is centered on an orthogonally extending axis 434*a*. The first pulley 420 has a spacing 450*a* between the axes 424*a* and 434*a* of the pulleys 420*a* and 430*a*. The distance 450*a* represents the eccentricity of the system 400*a*, and in the configuration of the system 400*a*, this distance 450*a* is substantially larger than the sum of the radii 422*a* and 432*a*.

FIG. 6C is a side view of a variable transmission 400*b* with the pulleys spaced a smaller distance apart from one another than the variable transmission of FIGS. 6A and 6B, and FIG. 6D is a top view of the variable transmission of FIG. 6C. The first pulley 420*b* has a radius 422*b* and is centered on an orthogonally extending axis 424*b*, and the second pulley 430*b* has a radius 432*b* and is centered on an orthogonally extending axis 434*b*. The spacing 450*b* between the axes 424*b* and 434*b* of the pulleys 420*b* and 430*b* is larger than the sum of the radii 422*b* and 432*b*, but not to the same degree as the difference in the system 400*a* of FIGS. 6A and 6B. Without nesting the pulleys 420*a* and 430*a*, the spacing 450*b* can only approach the sum of the radii 422*b* and 432*b*, but cannot be smaller than the sum of the radii 422*b* and 432*b*.

FIG. 6E is a side view of a variable transmission 400*c* with one of the pulleys partially nested within the other, and FIG. 6F is a top view of the variable transmission of FIG. 6E. The first pulley 420*c* has a radius 422*c* and is centered on an orthogonally extending axis 424*c*, and the second pulley 430*c* has a radius 432*c* and is centered on an orthogonally extending axis 434*c*. In the variable transmission 400*c*, the pulley 420*c* is a segmented pulley, allowing the pulley 430*c* to be nested partially within the segmented pulley 420*c*. The axis 434*c* of the pulley 430*c* intersects a portion of the pulley 420*c*.

Thus, spacing 450*c* between the axes 424*c* and 434*c* of the pulleys 420*c* and 430*c* can be made smaller than the sum of the radii 422*c* and 432*c*. In some embodiments, the eccentricity 450*c* can be small enough that the pulley 430*c* can be located entirely within pulley 420*c*. If both pulleys are segmented pulleys, the interior pulley 430*c* can have a larger effective diameter than the outer pulley 420*c*.

Figure 7A:
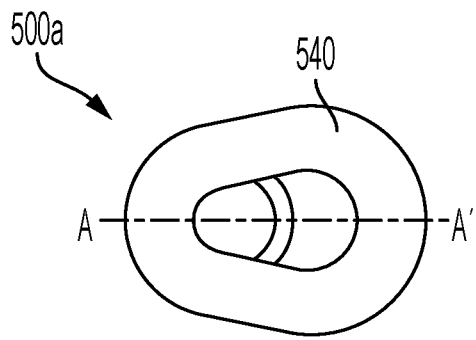
FIGS. 7A-7F schematically illustrate multiple configurations of a nested pulley variable transmission, illustrating a range of relative effective pulley diameters which can be achieved with a single system.
Figure 7B:
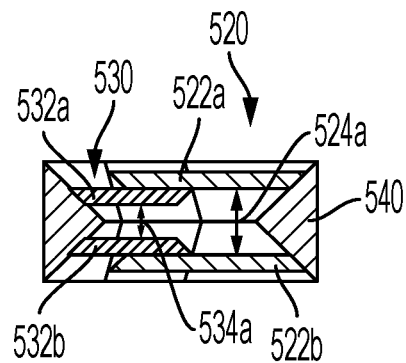

FIGS. 7A-7F schematically illustrate multiple configurations of a nested pulley variable transmission, illustrating a range of relative effective pulley diameters which can be achieved with a single system. FIG. 7A shows the variable transmission 500 in a first position, and FIG. 7B shows a cross-section of the variable transmission taken along the line A-A' of FIG. 7A.

It can be seen in FIG. 7B that an inner segmented pulley 530 is nested partially within an outer segmented pulley 520. The two segments 522*a* and 522*b* of the outer segmented pulley 520 are separated from one another by a distance 724*a*, and the two segments 532*a* and 532*b* of the inner segmented pulley are separated from one another by a distance 534*a*. As can be seen by the shape of the belt 540 in FIG. 7A, the outer segmented pulley 520 has a larger effective diameter than the inner segmented pulley 530 in this configuration.

Figure 7C:
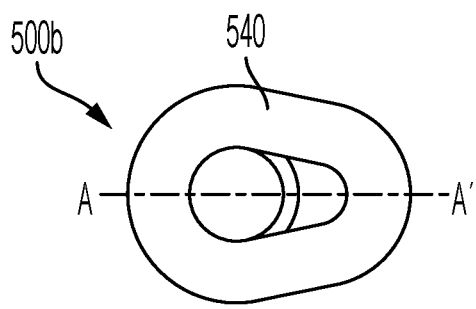
Figure 7D:
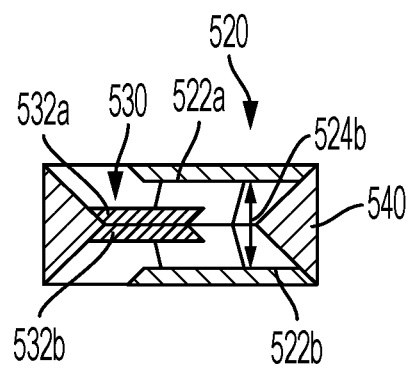

FIG. 7C shows the variable transmission 500 in a second position, and FIG. 7D shows a cross-section of the variable transmission taken along the line A-A' of FIG. 7C. It can be seen in FIG. 7D that the two segments 522*a* and 522*b* of the outer segmented pulley 520 are now separated from one another by a distance 524*b*, and the two segments 532*a* and 532*b* of the inner segmented pulley are brought into contact with one another. As can be seen by the shape of the belt 540 in FIG. 7C, the inner segmented pulley 530 has a larger effective diameter than the outer segmented pulley 520 in this configuration, despite having a smaller physical diameter and being nested within the outer segmented pulley.

Figure 7E:
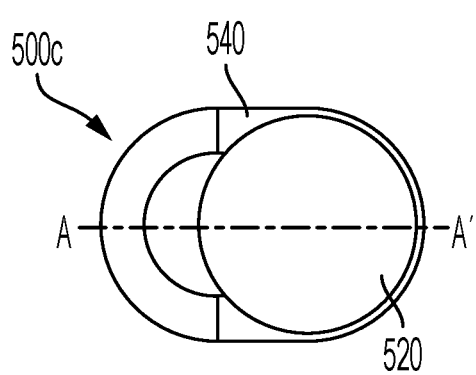
Figure 7F:
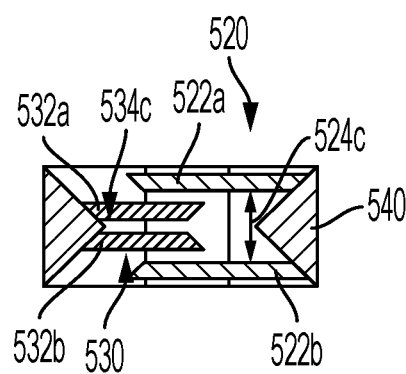

FIG. 7E shows the variable transmission 500 in a third position, and FIG. 7F shows a cross-section of the variable transmission taken along the line A-A' of FIG. 7C. It can be seen in FIG. 7D that the two segments 522*a* and 522*b* of the outer segmented pulley 520 are now separated from one another by a distance 524*c*, and the two segments 532*a* and 532*b* of the inner segmented pulley are now separated from one another by a distance 534*c*. As can be seen by the shape of the belt 540 in FIG. 7E, the inner segmented pulley 530 has the same effective diameter as the outer segmented pulley 520 in this configuration.

In an embodiment in which the inner pulley is rotationally grounded, and the variable transmission 500 is configured to be operated as an IVT, the inner pulley 530 may be rotationally grounded, and the outer pulley 520 may orbit around the inner pulley 530 when a rotational input is applied. When the transmission 500 is in the configuration of FIGS. 7A and 7B, a rotational input which causes the outer pulley 520 to orbit in a clockwise direction will cause the outer pulley 520 to rotate around its axis in a clockwise direction, as well, so that the output of the transmission will be clockwise in response to a clockwise rotational input. The gear ratio of the IVT is thus a positive gear ratio.

In contrast, when the transmission 500 is in the configuration of FIGS. 7C and 7D, the gear ratio of the IVT switches to a negative ratio. When the transmission 500 is in the configuration of FIGS. 7C and 7D, a rotational input which causes the outer pulley 520 to orbit in a clockwise direction will cause the outer pulley 520 to rotate around its axis in a counter-clockwise direction, as well, so that the output of the transmission will be counter-clockwise in response to a clockwise rotational input.

Similarly, when the transmission 500 is in the configuration of FIGS. 7E and 7F, the gear ratio of the IVT is an infinite ratio. When the transmission 500 is in the configuration of FIGS. 7C and 7D, a rotational input which causes the outer pulley 520 to orbit in a clockwise direction will not result in any rotation of the outer pulley 520 relative to the inner pulley 530 as it orbits the inner pulley 530. This configuration with an infinite gear ratio can alternatively be referred to as geared neutral.

Figure 8A:
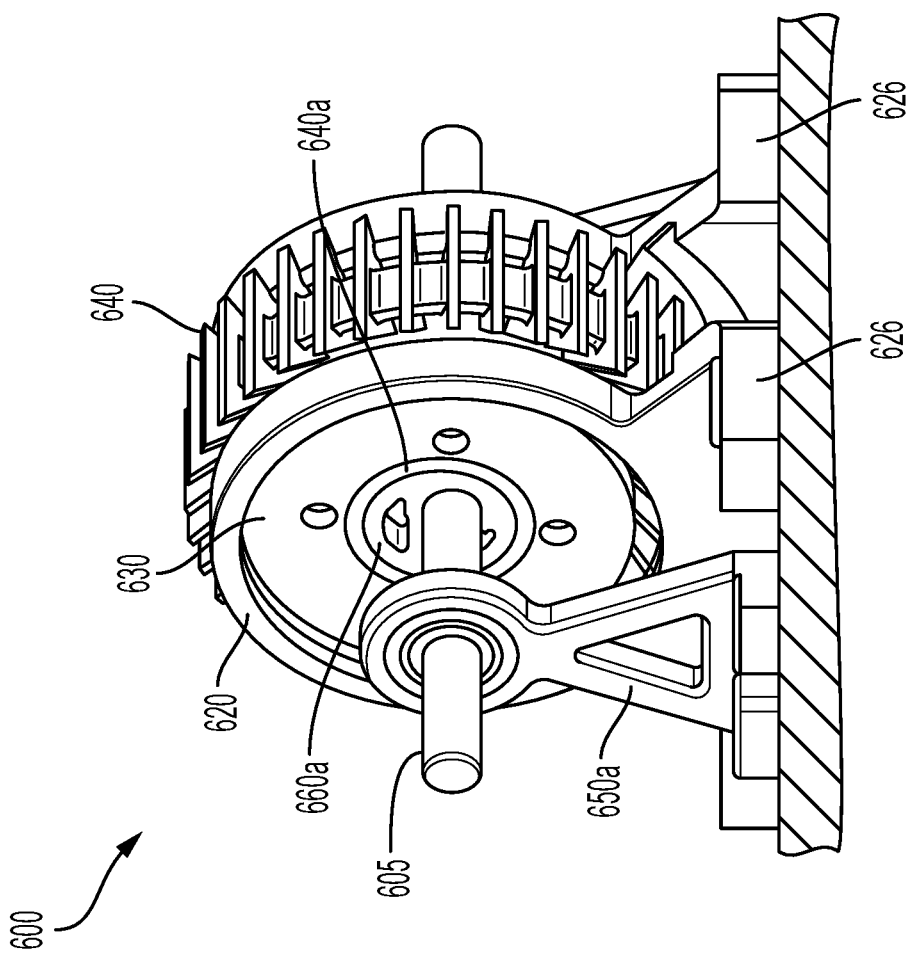
FIG. 8A is a side perspective view of an embodiment of a compact variable transmission.
Figure 8B:
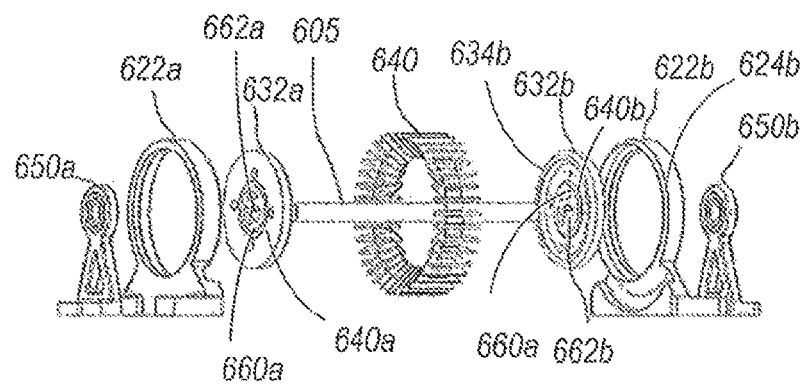
FIG. 8B is a side perspective exploded view of the transmission of FIG. 8A.
Figure 8C:
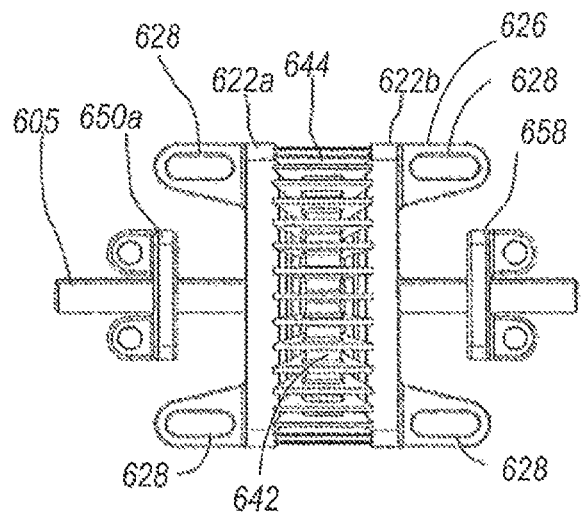
FIG. 8C is a top plan view of the transmission of FIG. 8A.

FIG. 8A is a side perspective view of an embodiment of a compact variable transmission. FIG. 8B is a side perspective exploded view of the transmission of FIG. 8A. FIG. 8C is a top plan view of the transmission of FIG. 8A. As can be seen in FIGS. 8A-8B, the transmission 600 includes an inner nested segmented pulley 630 formed by the combination of at least a first inner pulley segment 632*a* and a second inner pulley segment 632*b*. The transmission 600 also includes an outer segmented pulley 620 formed by the combination of at least a first outer pulley segment 622*a* and a second outer pulley segment 622*b*.

In the illustrated embodiment, the outer segmented pulley 620 is rotationally grounded, but at least one of the segments of outer segmented pulley 620 has at least some degree of freedom of longitudinal translation in a direction parallel to an axis about which the outer pulley 620 is centered. One method of rotationally fixing the outer segmented pulley 620 while permitting at least some longitudinal translation is through the use of obround or otherwise elongated apertures 628 in the footings 626 of the first outer pulley segment 622*a* and a second outer pulley segment 622*b*. A suitably-dimensioned fastener or other retaining structure inserted through the apertures 628 can inhibit lateral and transverse movement of the outer pulley segments 622*a* and 622*b*, while permitting a degree of longitudinal freedom which is dependent upon the length of the longest dimension of the obround apertures 628. In some embodiments, the apertures in the footings of one of the outer pulley segments may be obround, while the apertures in the other footings may be circular, such that only one of the outer pulley segments may be adjustable to vary the spacing between the two outer pulley segments. Any suitable motor, actuator, or other structure or technique may be used to induce longitudinal translation of one or both of the outer pulley segments 622*a* and 622*b*.

Portions of the belt 640 extend between the outer pulley segments 622*a* and 622*b*, as well as between the inner pulley segments 632*a* and 632*b*. The outer edge of the inner surfaces of the pulley segments may be beveled at an angle matching the angle of the contact surfaces of the belt 640. For example, it can be seen in FIG. 8B that the outer edge of the inner surface of the outer pulley segment 622b includes an angled contact surface 624b extending around the outer pulley segment 622b. Similarly, the outer edge of the inner surface of the inner pulley segment 632b includes an angled contact surface 634b extending around the outer pulley segment 632b

The belt 640 in the illustrated embodiment includes a solid inner belt 642 and a plurality of triangular sections 644 spaced apart from one another and supported by the solid inner belt 642. The angled sides of the triangular sections 644 form the contact surfaces of the belt in contact with the contact surfaces of the pulley segments. The use of a smaller solid section and a plurality of triangular sections spaced apart from one another can reduce the weight of the belt as compared to a solid belt. Although the sections are illustrated as triangular, portions of the sections which will not contact the pulley segments may be truncated or otherwise modified to further reduce the weight and size of the belt 640. In addition, contact surface shapes other than triangular shapes may be used in other embodiments, including convex or concave surfaces. A wide variety of other belt designs may also be used, as discussed in greater detail elsewhere herein.

The transmission also includes an input shaft 605 which passes through support bracket 650a and into an eccentric cam structure 660a disposed within the first inner pulley segment 632a. A bearing 640a couples the eccentric cam structure 660a to the first inner pulley segment 632a. The input shaft passes through and is coupled to another eccentric cam structure 660b coupled via a bearing 640a to the second inner pulley segment 632b. An additional bracket 650b on the opposite side of the transmission 600 as the bracket 650a can provide additional support for the input shaft.

As the input shaft 605 is coupled to the eccentric cam structures 660a and 660b via apertures 662a and 662b which are off-center or non-coaxial with the centerpoint of eccentric cam structures 660a and 660b, rotation of the input shaft 605 induces eccentric rotation of the eccentric cam structures 660a and 660b about the input shaft. This eccentric rotation induces orbiting of the first inner pulley segment 632a and second inner pulley segment 632b about the input shaft 605. Thus, the inner segmented pulley 630 rotates with an eccentricity about the axis of the input shaft 605.

In some embodiments, the spacing between the segments of the outer pulley 620 can be directly controlled, and the spacing between the segments of the inner pulley 630 can be adjusted in response, such as through the use of a spring biasing the segments of the inner pulley 630 together to maintain belt tension when the segments of the outer pulley 620 are adjusted. In some embodiments, both the spacing between the segments of the outer pulley 620 and the spacing between the segments of the inner pulley 630 can be directly controlled.

The transmission 600 includes two segmented pulleys, where the distances between the pulleys can be controlled either directly or indirectly. Changes in the distances between the segments of the pulleys will allow a change in the gear ratio of the transmission 600. When one of the pulleys, such as the outer pulley 620, is rotationally grounded, the transmission 600 may function as an infinitely variable transmission. Embodiments of the transmission 600 are therefore capable of providing a range of transmission ratios, including positive, negative, and infinity, by changing the spacing of the segments. This allows reversal of the output of the transmission without the need for a separate gear, providing a compact and versatile transmission capable of operating over a range of gear ratios spanning both positive and negative values. In addition, because the pulleys are nested within one another, the eccentricity of the transmission 600 can be significantly reduced in comparison to other IVT designs.

As only a portion of a pulley half may be in contact with the belt and under load at a given time, the separation of a pulley segment into a plurality of radial segments may allow the effective diameter of the pulley to be adjusted when particular radial segments are not in contact with the belt. This iterative alteration of the effective diameter of the pulley over one or more rotations of the belt relative to the pulley may allow for extremely rapid shifts in the transmission ratio because the shifting of each radial segment can occur when that radial segment is unloaded.

Figure 9:
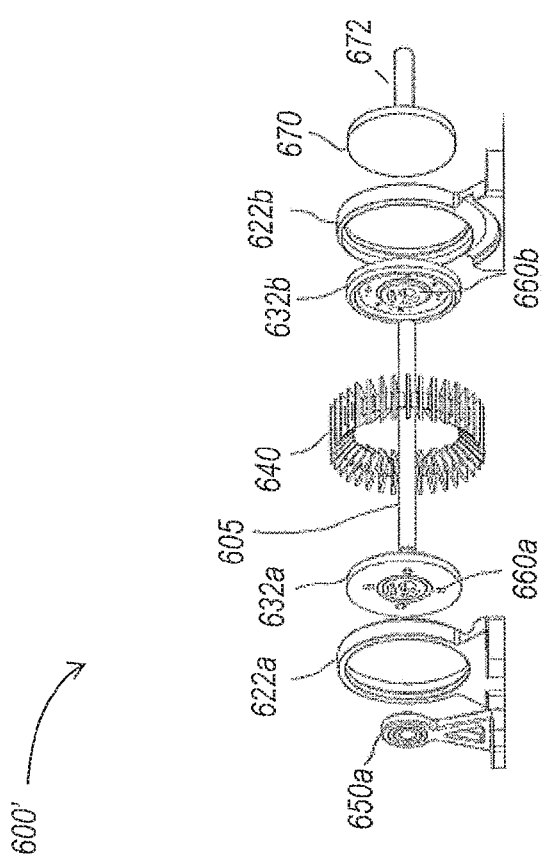
FIG. 9 is a side perspective view of another embodiment of a compact variable transmission.

FIG. 9 is a side perspective view of another embodiment of a compact variable transmission. The transmission 600' of FIG. 9 differs from the transmission 600 of FIGS. 8A-8C in that the input shaft 605 does not extend beyond the second inner pulley segment 632b, and that an output disk 670 is coupled to the second inner pulley segment 632b and can be used to harness the output of the transmission 600'. In the illustrated embodiment, the output disk 670 includes an outwardly extending shaft or axle 672. The output disk 670 will rotate along with the inner pulley segment 632b, although the output disk 670 will also orbit in an eccentric manner along with the inner pulley segment 632b. A wide variety of suitable mechanisms, linkages, or other techniques may be used to compensate and correct for the eccentricity, including for example Oldham couplings as discussed above.

A wide variety of design variables can be modified to control the operation of such compact variable transmissions. For example, varying the eccentricity of the design can increase the range of available transmission ratios. A larger eccentricity increases the possible difference between the effective radii of the two pulleys. A larger difference between the two pulley diameters allows them to function farther away from the differential-like state used to achieve geared neutral. However, an increase in eccentricity also shifts mass away from the axis of the rotationally fixed pulley, and an increase in the imbalance in the system may require more substantial compensation for this eccentricity, such as the use of counterweights or shifts in the axis of rotation of the system to a location other than the axis of the rotationally fixed pulley.

Figure 10:
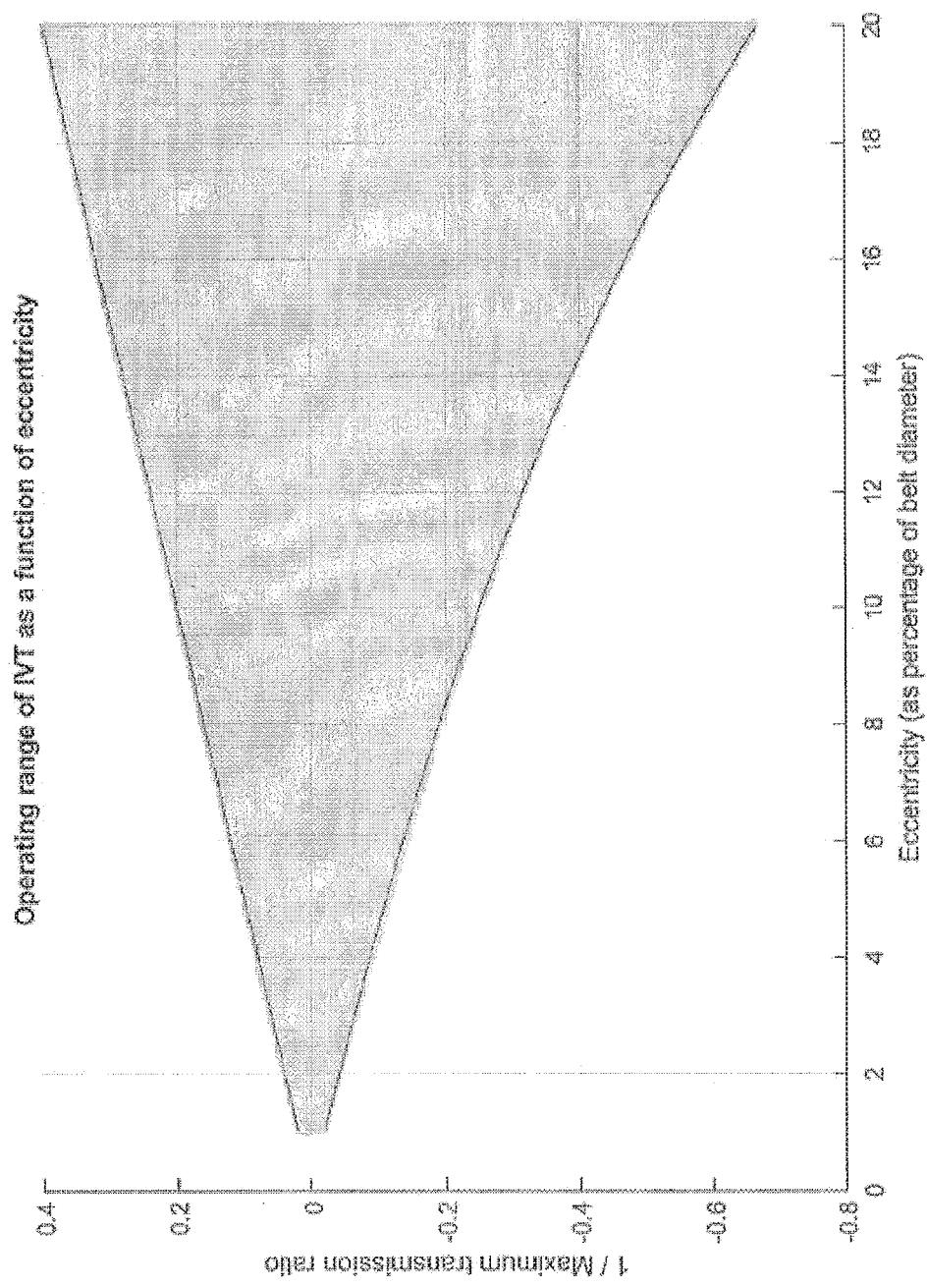
FIG. 10 shows a plot of the operating range of one embodiment of an IVT as a function of eccentricity.

A pulley at its largest is fully engaged with the belt, so the diameter is equal to the belt diameter. The smallest pulley configuration that can do work has a point contact with the belt, but is not engaged anywhere else. Thus, an IVT having an eccentricity E and a belt diameter D will have a maximum forward transmission ratio of D/2E and a maximum reverse transmission ratio of (D−2E)/(2E). FIG. 10 shows a plot of the operating range of an IVT as a function of eccentricity. An IVT with an eccentricity E of 1% of its belt diameter D can operate in a transmission ratio range of ±50:1, where the transmission ratio is defined as the ratio of the output speed to the input speed. Similarly, an IVT with an eccentricity E of 10% of its belt diameter D can operate in a transmission ratio range of ±5:1.

Figure 11:
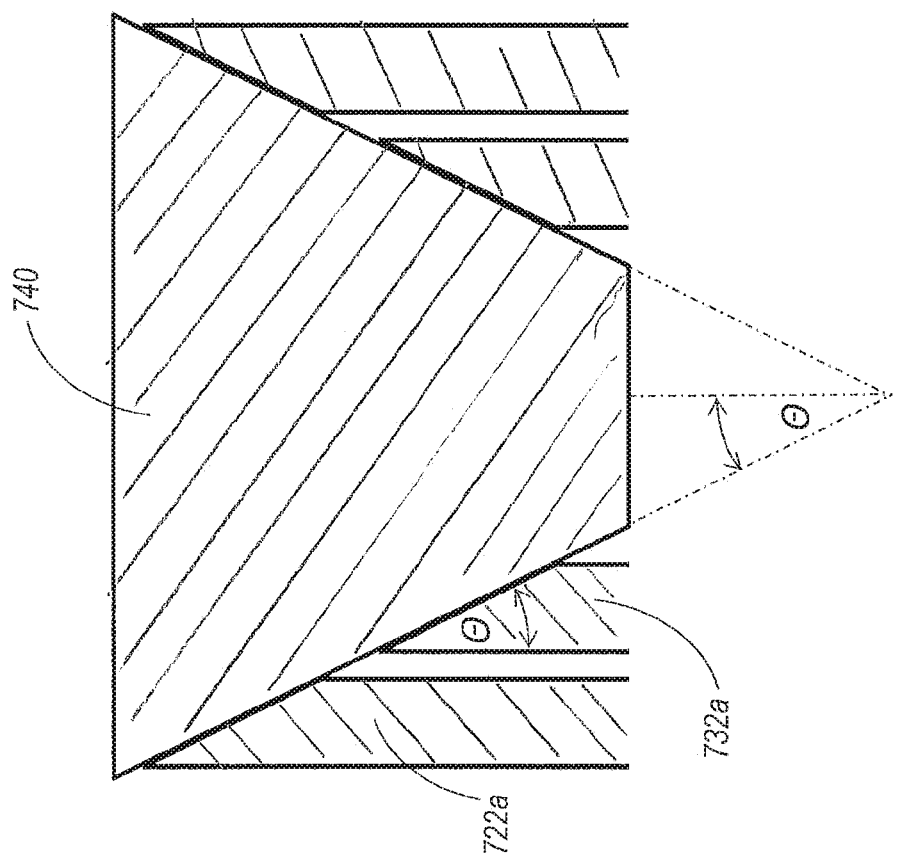
FIG. 11 schematically illustrates a cross-sectional view of a trapezoidal belt section and corresponding pulley contact surfaces.

Another design variable that can be adjusted to control the behavior of the IVT is the shape of the V-belt and the contact surfaces of the pulley segments. FIG. 11 illustrates a cross-sectional view of a trapezoidal belt section and corresponding pulley contact surfaces. The angle Θ between the contact surfaces of the pulley segments 722a and 732a is identical to the angle between the contact surfaces of the belt section 740 and the vertical plane orthogonal to the axes about which the pulleys are centered. By varying this angle Θ, aspects of the operation of the IVT may be controlled. For example, the angle Θ defines the mechanical advantage relationship between the tension in the belt and the shifting force which generates an axial compressive force on the pulley segments.

By decreasing the angle Θ, an acute V-belt may be provided. Such an acute V-belt has a large mechanical advantage against the pulley segments when under increasing tension. If the shifter can be backdriven, the shifter would have to generate a large force to counteract increased belt tension and remain in the same ratio. In addition, the amount of axial displacement of the pulley segments required to effectuate a given transmission ratio change will be affected. The smaller the angle Θ and the more acute the V-belt, the smaller the amount of axial translation required to change the transmission ratio. For acute V-belts, large increases in belt tension over brief periods of time may cause a wedging effect on the belt, increasing belt traction and decreasing the likelihood of belt slip.

In contrast, by increasing the angle Θ, an obtuse V-belt may be provided. Such an obtuse V-belt could be more easily shifted to a new transmission ratio, without feeling the pressure of the V-belt from the working tension, due to increased friction between the obtuse V-belt and the pulley segments. In addition, the amount of axial translation required to effectuate a given transmission ratio change is larger, requiring an increase in the axial length of the transmission. This increase in axial length allows for greater precision in the selection of a given transmission ratio. The increased precision may be particularly helpful for transmission ratios near zero (or geared neutral), where a small change in pulley effective diameter may have a significant impact on the transmission ratio.

In addition, the design of the V-belt can allow or facilitate additional control methods. Changing the spacing between the segmented pulleys of a variable transmission of the type discussed herein can be accomplished in at least two ways. First, the shifter can squeeze the belt to a larger effective diameter, putting positive work into the system. Second, the belt tension can be used to squeeze the pulley segments apart, which can effectively use the prime mover power source to effectuate the shift. The viability of the second method is dependent at least in part on the shape of the V-belt. An acute V-belt shape can facilitate the use of the second control method, as the increasing friction with the use of more obtuse V-belts can make it difficult to force the pulley segments apart by increasing belt tension.

The design of the V-belt may affect the spacing between the pulley segments of segmented pulleys. However, a wide variety of pulley segment designs may also be used, certain of which may also affect the spacing between the pulley segments. In certain embodiments discussed above, the pulley segments are generally planar structures with a beveled outer edge to form the contact surfaces. However, in other embodiments, additional spacing may be provided between pulley segments by including inwardly-extending features on the pulley segments which extend toward the belt.

Figure 12:
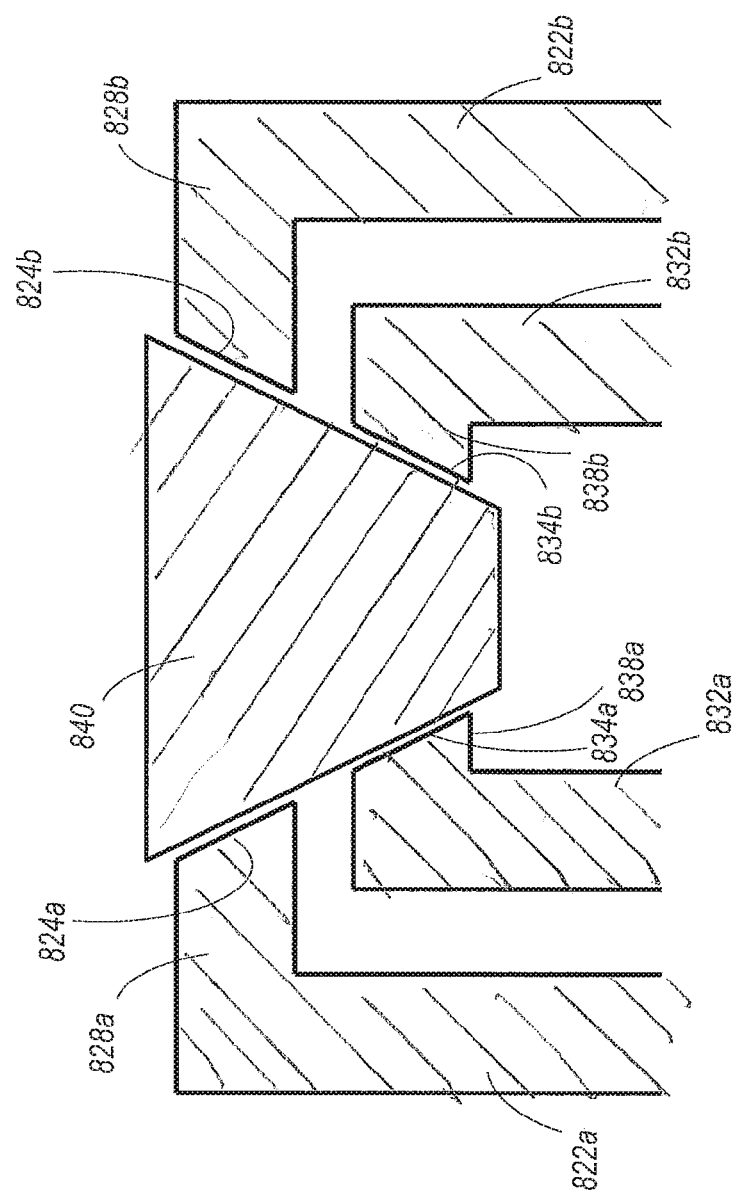
FIG. 12 schematically illustrates contact between a trapezoidal belt section and pulley segments including inwardly extending portions.

FIG. 12 schematically illustrates contact between a trapezoidal belt section and pulley segments including inwardly extending portions. The exact cross-section illustrated in FIG. 12 may not occur during normal operation of variable transmission embodiments described herein, as the first pulley and the second pulley will be in contact with different lengthwise sections of the belt. The schematic illustration of FIG. 12 nevertheless demonstrates the differences in the radial and/or axial positions of the contact area between the first pulley and the belt and the contact area between the second pulley and the belt. The outer pulley segments 822a and 822b in the illustrated embodiment include inwardly extending sections 828a and 828b which terminate in contact surfaces 824a and 824b adjacent the belt 840. Similarly, the inner pulley segments 832a and 832b in the illustrated embodiment include inwardly extending sections 838a and 838b which terminate in contact surfaces 834a and 834b adjacent the belt 830. In some embodiments, only one set of pulley segments include inwardly-extending features, such as the outer pulley segments 822a and 822b, for example. Such a configuration provides additional clearance for the inner pulley and any other associated or internal structures.

The use of such inwardly-extending features to provide additional space for the pulley segments may be of particular use when the V-belt is more acute, and would otherwise require very close spacing between the inner pulley and outer pulley segments. In other embodiments, such features may provide additional clearance for mechanisms for independent control of the spacing between inner pulley segments.

Figure 13:
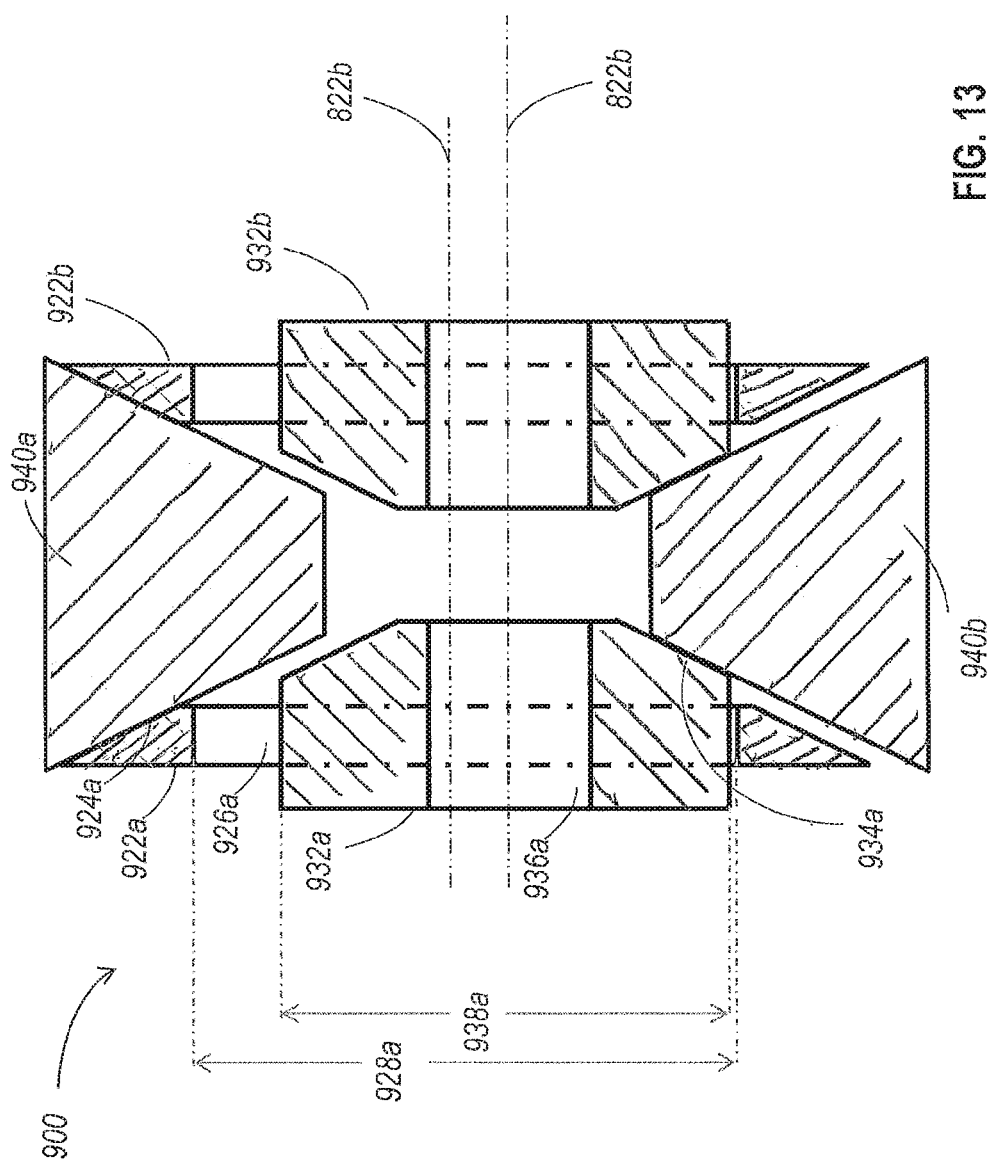
FIG. 13 is a cross-sectional view of an embodiment of a variable transmission in which an outer segmented pulley is configured to provide clearance for the eccentricity of an inner pulley.

In some embodiments, the inner pulley need not be located entirely within the longitudinal boundaries of the outer pulley. FIG. 13 is a cross-sectional view of an embodiment of a variable transmission in which an outer segmented pulley is configured to provide clearance for the eccentricity of an inner pulley. The transmission 900 includes a first outer pulley segment 922a and a second outer pulley segment 922. The first outer pulley segment 922a includes a contact surface 924a which is in contact with the upper belt portion 940a but not the lower belt portion 940b. The first outer pulley segment 922a also includes an aperture 926a of height 928a extending therethrough.

The transmission 900 also includes a first inner pulley segment 932a and a second inner pulley segment 932b. The first inner pulley segment 932a includes a contact surface 934a which is in contact with the lower belt portion 940b but not with the upper belt portion 940a. The first inner pulley segment 932a also includes an aperture 936a extending therethrough. The aperture 926a may provide, for example, a space for coupling an eccentric cam or other feature which induces orbiting of the inner pulley in response to an input. The first inner pulley segment 932a extends at least part of the way into the aperture 926a in the first outer pulley segment 922a. In the illustrated embodiment, the first inner pulley segment 932a extends all the way through the aperture 926a in the first outer pulley segment 922a. The clearance provided by the aperture 926a in the first outer pulley segment 922a allows the inner pulley segment 932a to extend longitudinally beyond the longitudinally outermost edge of the first outer pulley segment 922a.

As can be seen in FIG. 13, the axis 972 about which the inner pulley is centered is not aligned with the axis 970 about which the outer pulley is centered, due to the eccentric orbiting of the inner pulley about the axis 970 or another axis of rotation. It can also be seen that the height 928a of the aperture 926a in the first outer pulley segment 922a is larger than the height of the inner pulley segment 932a by a distance at least large enough to provide clearance for the eccentric movement of the portion of the inner pulley segment 932a disposed within the aperture 926a.

Figure 14:
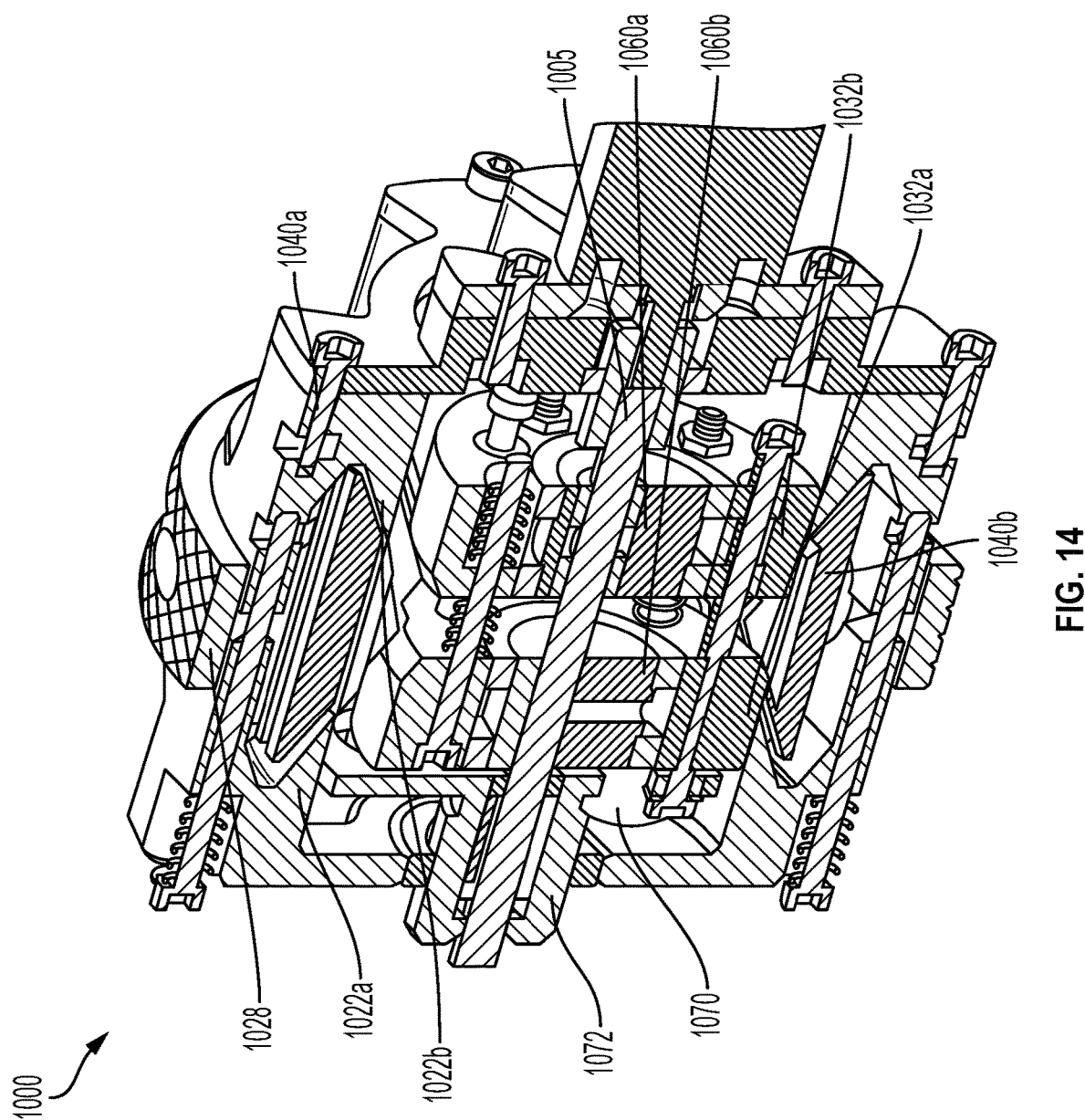
FIG. 14 is a perspective cross-sectional view of an embodiment of a variable transmission.

FIG. 14 is a perspective cross-sectional view of an embodiment of a variable transmission. It can be seen in FIG. 14 that the transmission 1000 includes a drive shaft 1005 coupled to at least one of the inner pulley segments 1032a and 1032b via eccentric cams 1060a and/or 1060b. The contact surfaces 1034a and 1034b of the inner pulley segments 1032a and 1032b, respectively, are in contact with the lower section 1040b of the V-belt. In the illustrated embodiment, the belt 1040 is an obtuse V-belt, but the design may be modified to accommodate any shape of V-belt. At least one spring 1038 biases the inner pulley segments 1032a and 1032b towards one another and against the V-belt. A cage gear 1070 coupled to the inner pulley segment 1032a transmits the rotation of the inner pulley segment 1032a out of the transmission via the rotation of output shaft 1072, a portion of which surrounds a portion of drive shaft 1005.

The upper section 1040a of the V-belt is also in contact with the contact surface of outer pulley segment 1022a and contact surface of outer pulley segment 1022b. The outer pulley segments 1022a and 1022b may be rotationally grounded, but able to be translated relative to one another in the direction of the drive shaft 1005 to vary the spacing between the outer pulley segments 1022a and 1022b and change the effective diameter of the outer pulley.

A ratio shifter 1028 can be used to adjust the distance between the outer pulley segments 1022a and 1022b. The resulting change in the position of the V-belt will cause a corresponding change in the distance between the inner pulley segments 1032a and 1032b. As rotation of the drive shaft 1005 is translated into eccentric rotation of the inner pulley segments due to the coupling with the eccentric cams 1060a and/or 1060b, the inner pulley segments will orbit together around the axis of rotation of the transmission 1000, which may be aligned with the axis of the drive shaft 1005. This orbiting of the inner pulley segments 1032a and 1032b will result in rotation of the inner pulley segments 1032a and 1032b as they orbit. The rotation of the inner pulley segment 1032a will cause the output cage gear to rotate, which can be used as the output of the transmission 1000.

Any suitable shifting mechanism may be used to adjust the spacing between pulley segments, whether independently or in response to the shifting of the other pulley segments. As discussed above, a spring may be used as a biasing mechanism. In some embodiments, the spring may be a linear spring, while in other embodiments the spring may be a constant-force spring. In some embodiments, a cam mechanism may be used to modify the force exerted by a spring so that the belt tension is different at different transmission ratios. For example, the belt tension may be greater at higher transmission ratios, when the difference between the effective diameters of the pulleys is largest, and lower at lower transmission ratios, when the effective diameters of the pulleys are similar to one another. In some other embodiments, a mechanical linkage may be used to cause displacement of at least one of the pulley segments relative to the other pulley segment. One embodiment of such a mechanical linkage is described elsewhere herein with respect to FIG. 20.

In some embodiments, a servo or other actuator may be used. As discussed elsewhere herein, the servo may include an electric motor positioned on one of the pulley segments and configured to induce movement of one of the pulley segments relative to the other. In some embodiments, rotation of a threaded structure may be used to pull the two pulley segments together or push them apart. In some embodiments, hydraulic or pneumatic actuators may be used to change the distance between the two pulley segments, as discussed in greater detail elsewhere herein. In other embodiments, a centrifugal clutch or similar structure may be used to shift the transmission.

Figure 15:
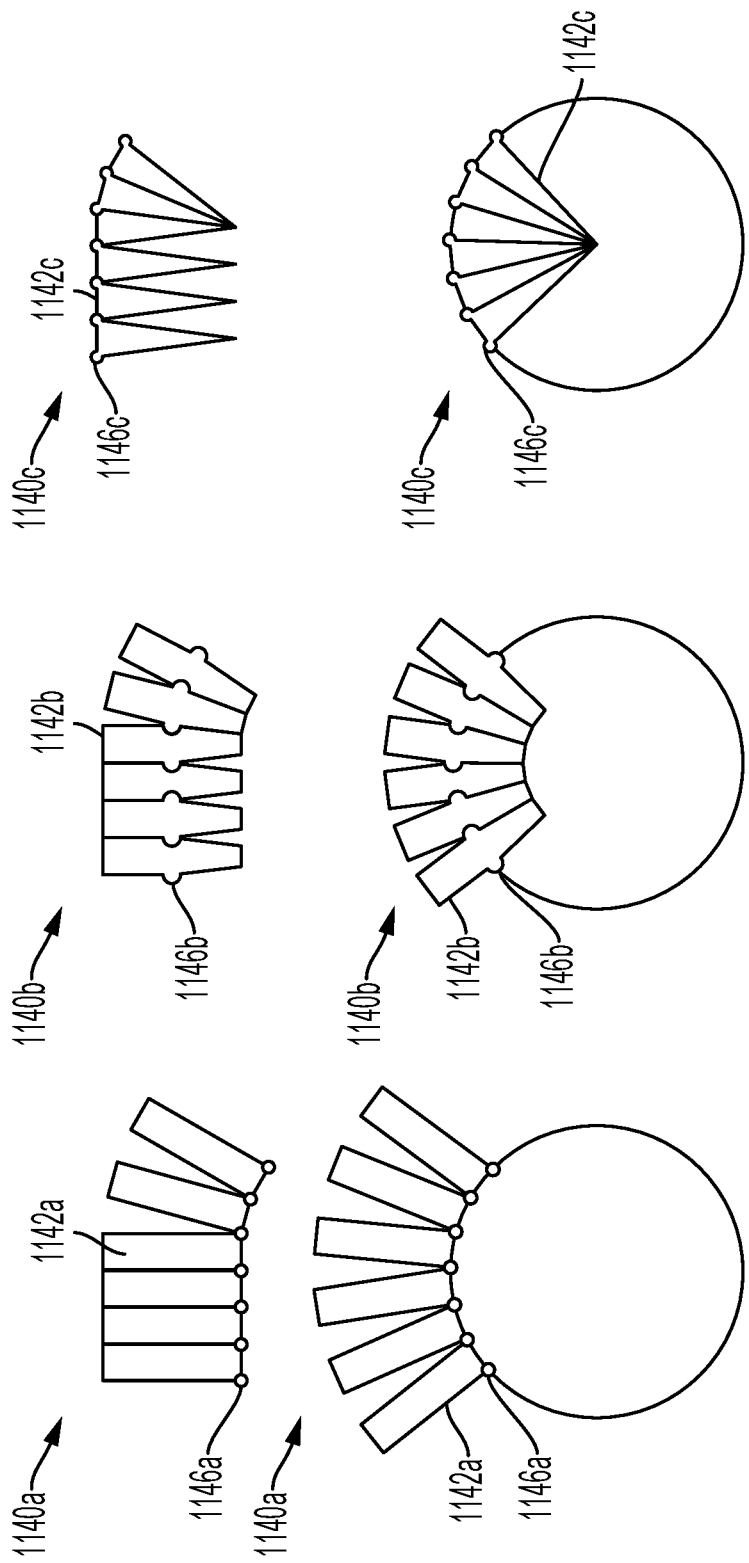
FIGS. 15A-15C are side views of various embodiments of segmented belts.

As noted above, a wide variety of belt designs may be used to connect the pulleys of the variable transmissions together. In some embodiments, a segmented belt may be used. FIGS. 15A-15C are side views of various embodiments of segmented belts. In FIG. 15A, the belt 1140a includes a plurality of belt segments 1142a connected to one another at the inner edge of the belt 1140a by a plurality of pins 1146a extending through extending portions of adjacent belt segments 1142a. Each pin 1146a extends through one or more portions of two adjacent belt segments 1142a. The pins 1446a allow the belt segments 1442a to pivot relative to one another around the pivot points at the pins 1146a. As the pivot points of the belt 1140a at the pins 1146a are located at or near the point most radially inward of the rest of the belt 1140a, the belt segments 1142a can be a substantially constant thickness, or no thicker than the thickness of the belt segments 1142a at the locations of the pins 1146a, so the belt 1140a is able to assume a substantially straight shape in the sections of the belt 1140a not in contact with one of the pulleys.

In FIG. 15B, the belt 1140b includes a plurality of belt segments 1142b connected to one another at a point near the middle of the belt 1140b by a plurality of pins 1146b extending through extending portions of adjacent belt segments 1142b. The outer portions of the belt segments 1142b located radially outward of the pins 1140b are substantially the same thickness, or are no thicker than the spacing between the pins 1146b. In contrast, the inner portions of the belt segments 1142b taper with increasing distance from the pins 1146 to allow the belt 1140b to curve to provide a minimum belt diameter represented by the diameter of the circle. The minimum belt diameter is dependent at least in part on the degree of tapering of the inner portions of the belt segments 1142b.

In FIG. 15C, the belt 1140c includes a plurality of belt segments 1142c connected to one another at a point near the outer edge of the belt 1140c by a plurality of pins 1146c extending through extending portions of adjacent belt segments 1142c. As most or all of the belt segments 1142c are located radially inward of the pins 1146, nearly the entire height of the belt segments 114c are tapered. As the taper angle of the illustrated belt segments 1142c is the same as the taper angle of the inner portions of the illustrated belt segments 1142b, the maximum belt curvature of belt 1140b and 1140c are substantially identical, despite their other differences in structure and shape. The minimum radii about which the belts 1140b and 1140c may be curved are identical.

As the effective diameters of the pulleys change, the contact points between the pulley and the belt segments move up or down along the outer surface of the belt segments. While the belt segments pivot around the pin locations relative to the adjacent pins, the location of the pins along the belt elements is a free design variable. The magnitude of the displacement of a given point on the belt element relative to adjacent belt elements increases with increasing distance from the pin, so that the only location on the belt with constant length is the section of the belt that runs through the pin locations.

In a segmented belt such as the belts of FIGS. 15A-15C, the individual segments will engage and disengage from the pulleys as the belt moves around the pulleys. This engagement and disengagement may create a small velocity ripple in the output of the transmission. This velocity ripple may be minimized by increasing the number of segments, but certain materials and belt designs may have different limits on the number of segments which can be formed in a given belt, due to the decrease in thickness of the segments as the segment count increases.

Figure 17A:
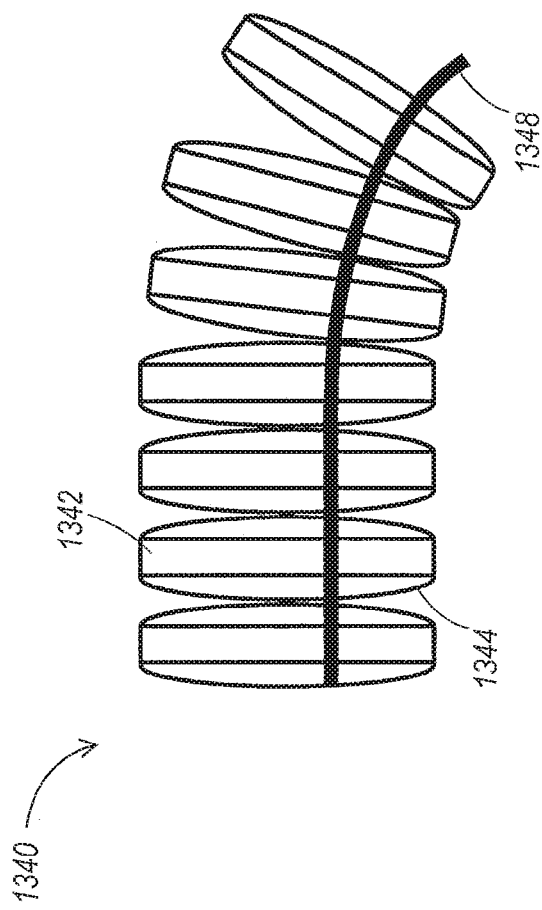
FIGS. 17A and 17B schematically illustrate an embodiment of a push-belt which includes belt segments having curved contact surfaces.
Figure 17B:
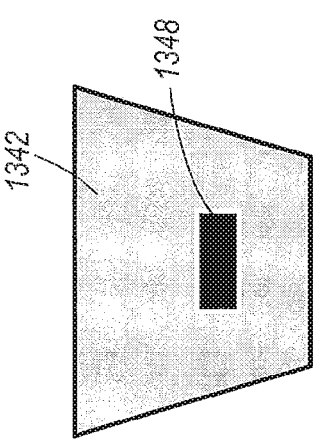

In some embodiments, such as those described herein with respect to FIGS. 17A and 17B, the belt elements of a segmented belt may be loaded against each other in compression, rather than tension, so that the segmented belt functions as a push-belt. In some embodiments, alternative belt shapes may be provided through the use of non-triangular and/or non-symmetrical belt segment shapes. For example, a trapezoidal shape formed by truncating the inner vertex of a triangular belt shape may be used instead of a triangular belt segment to increase the maximum belt strength of the belt and/or reduce the total weight of the belt. In some embodiments, the belt and corresponding pulley surfaces need not be symmetrical, but may instead be asymmetrical triangles, trapezoids, or other suitable shapes.

Figure 16:
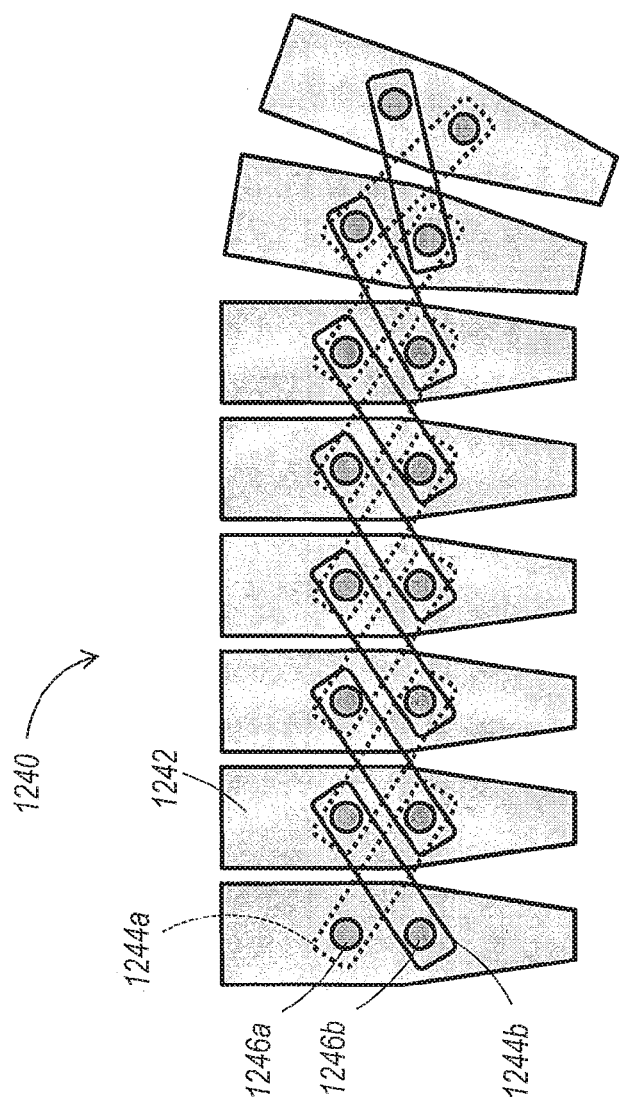
FIG. 16 schematically illustrates a belt which includes four-bar linkages connecting adjacent belt segments.

In another embodiment, a more complex linkage may be provided between the belt segments of a belt. FIG. 16 schematically illustrates a belt which includes four-bar linkages connecting adjacent belt segments. The belt 1240 includes a plurality of belt segments 1242. Two pins 1246*a* and 1246*b* extend through each of the belt segments 1242. On each side of the belt segments 1242, an inner bar 1244*a* (illustrated with a dashed line) extends between a first pin of a first belt segment and the second pin of an adjacent belt segment, and an outer bar 1244*b* extends between the second pin of the first belt segment and the first pin of the adjacent belt segment. An inner and outer bar are also similarly connected on the opposite side of the belt segments 1242. Thus, each pin 1246*a* and 1246*b* extends through two inner bars and two outer bars total. The kinematics of the belt 1240 will be different than the kinematics of the belt 1140 in which a single pin links adjacent belt segments.

Other belt designs may also be used. As noted above, in some embodiments, the belt segments may be loaded against each other in compression, rather than tension, such that the belt functions as push-belt. In some embodiments, the kinematics of the belt may be further controlled by including curved surfaces at the interface between belt segments. FIGS. 17A and 17B schematically illustrate an embodiment of a push-belt which includes belt segments having curved contact surfaces. FIG. 17A is a side cross-sectional view of the belt 1340, and FIG. 17B is a cross-sectional view taken through of one of the belt segments. The belt 1340 includes a plurality of belt segments 1342 which in the illustrated embodiment have a generally trapezoidal cross-section. A tension belt 1348 extends through the plurality of belt segments 1342, although the belt segments 1342 may be free to slide along the tension belt 1348. In addition, the facing surfaces 1344 of the belt segments 1342 have a curved profile, instead of a planar and/or angled profile as shown in the embodiments of FIGS. 15A-15C.

The design and use of the curved profile of the facing surfaces 1344 can be used to alter the kinematics of the belt 1340 in a number of ways. By providing a curved contact surface on the facing surfaces 1344 of the belt segments 1342, the spacing between the belt segments 1342 can be altered depending upon the angle between adjacent belt segments, which will in turn control the point on the curved surfaces at which the adjacent belt segments contact one another. In some embodiments, the curved surface may include a non-circular curved surface, or a surface where the curvature is asymmetrical relative to the belt location. Design of the curved contact surfaces can, for example, linearize the relationship between an increase in the first pulley diameter and a corresponding decrease in the second pulley diameter, as the spacing between belt segments in contact with a pulley may be dependent upon the effective diameter or belt diameter of the pulley, due to the curved contact surfaces. The design of the curved surfaces can also be used to control the distribution of mass in the belt 1340 so that it remains balanced over a range of transmission ratios, or the eccentricity of the belt mass is reduced.

The innermost edges of the belt segments may determine the minimum bending radius as the belt wraps around the pulley, as discussed above. The distance between the connection point at the pins and the innermost edge of the belt segments will impact how far the innermost edges must travel to engage the pulleys, and certain configurations can limit the number of belt segments that can fit within the bending radius of the belt.

In other embodiments, at least some of the pins of the belts of FIGS. 15A-15C may be replaced with thin connecting sections which function as living hinges, so that the belt (or sections of the belt including multiple belt segments) may be a single piece.

Other variations on the embodiments described herein may also be realized. For instance, in the embodiments discussed above, either inner or outer pulley can be chosen to be grounded, while the rotation of the other is the output. In still other embodiments, one of the pulleys may have a fixed effective diameter, and the eccentricity of one of the pulleys may instead be varied to take up belt length as the other pulley dictates transmission ratio.

FIG. 18 shows an embodiment of a variable transmission in which one of the pulleys has a fixed effective diameter. The transmission 1400 includes a nested interior pulley 1430 in which the interior pulley has a fixed effective diameter, and is centered around an axis 1434. The fixed effective diameter of the nested interior pulley may be achieved by providing a unitary pulley 1430 as illustrated, or by coupling at least two pulley segments to one another in such a manner that longitudinal translation of the pulley segments relative to one another is inhibited. The outer pulley 1420 includes two pulley segments 1422*a* and 1422*b* configured to rotate around axis 1424. An actuator 1428 can be used to change the distance between the pulley segments 1422*a* and 1422*b* to vary the effective diameter of the pulley 1420.

The eccentricity of the interior pulley 1430, which can be visualized in FIG. 18 as the spacing between the axis 1434 of the nested pulley 1430 and the axis 1424 of the outer segmented pulley 1420, is not fixed, and can be changed. In some embodiments, the eccentricity of the interior pulley 1430 may change in response to a change in the effective diameter of the outer pulley 1420. In some embodiments, the eccentricity of the interior pulley 1420 may be directly controlled using a suitable control mechanism. A compensation mechanism such as a linear bearing or an Oldham coupling 1480 may be used to compensate for the eccentricity of the pulley 1430 as it orbits within the transmission. The inertia of the wobbling pulley may provide belt tension proportional to the angular velocity of the input applied via input shaft 1405.

Other design variations may also be made. As discussed above, in some embodiments, a single mechanism may be used to change the transmission ratio, rather than using two separate mechanisms which each control a variable parameter of the transmission. In an embodiment in which the belt length and the eccentricity of the transmission are fixed, the change in effective diameter of one pulley will not necessarily be equal to the change in the corresponding change in effective diameter of the other pulley. A variety of mechanisms can be used to compensate for the non-linearity of the relationship.

FIG. 19 schematically illustrates the use of a curved contact surface between a pulley and a belt. The system 1500 includes a V-shaped belt 1540, and two pulley segments 1522a and 1522b. In the illustrated embodiment, the pulley segment 1522a includes a curved contact surface 1524a, and the pulley segment 1522b includes a similarly shaped curved contact surface 1524b. Because the contact surfaces 1524a and 1524b are curved, the relationship between a given change in spacing between the pulley segments 1522a and 1522b and the effective diameter of the pulley will be a non-linear relationship dependent upon the point of the curved surfaces 1524a and 1524b currently in contact with the pulley segments 1522a and 1522b. The particular curve of the surface may be selected to provide a desired relationship between effective pulley diameter and pulley spacing over a particular range of pulley segment positions.

In some embodiments, the contact surfaces of both the inner and outer pulleys may be at least partially curved, while in other embodiments, only one of the inner and outer pulleys may include a curved contact surface. In some embodiments, the contact surfaces of the belt may be curved.

FIG. 20 is another embodiment of a variable transmission in which a single mechanism can be used to control the transmission ratio of the device. The transmission 1600 includes first and second outer pulley segments 1622a and 1622b, and first and second inner pulley segments 1632a and 1632b. An equalizer mechanism 1670 is used to equalize the force applied to the second outer pulley segment 1622b and the second inner pulley segment 1632b. In the illustrated embodiment, the equalizer mechanism 1670 is a whiffletree mechanism, although other suitable mechanisms may also be used.

One arm 1674a of the equalizer mechanism 1670 may be directly coupled to a pulley segment of the rotationally fixed pulley, which in the illustrated embodiment is the second outer pulley segment 1622b. Another arm 1674b of the equalizer mechanism 1670 may be coupled to a pulley segment of the other pulley, which in the illustrated embodiment is the second inner pulley segment 1632b, using a bearing such as a planar bearing 1678. The use of a planar bearing 1678 allows force to be applied by the arm 1674b of the equalizer mechanism 1670 to alter the spacing between the first and second inner pulley segments 1632a and 1632b, while still permitting rotation and eccentric orbiting of the first and second inner pulley segments 1632a and 1632b.

Torque applied to the crossbar 1672 of the equalizer mechanism 1670 will change the transmission ratio by applying unequal forces to the second inner pulley segment 1632b and the second outer pulley segment 1622b. A force can be applied to the cam structure 1680 towards the pulleys that is distributed equally to both pulleys, thus providing the primary working tension in the belt. The shape of the cam structure 1680 can be used to modulate the displacement and force ratio depending on the relative positions of inner and outer pulleys, so that a single degree of freedom can be used to control the effective diameter of both pulleys.

In some embodiments, a variable transmission may include features which increase the belt traction. For example, in an embodiment such as FIG. 19, where one or both of the pulleys makes point contact with the belt, an increase in belt traction may prevent or reduce slippage despite the smaller contact area. In some embodiments, electrostatic attraction between the belt and the pulleys may be used to increase belt tension without decreasing the efficiency of the belt. In some embodiments, electromagnetic forces may be used to increase belt traction. For example, the belt may include a ferrous material, and at least one electromagnet in the pulley may be used to increase belt traction without decreasing the efficiency of the belt.

Electromagnetic forces may be used to control or otherwise affect the operation of other aspects of the transmission. For example, electromagnetic forces may be used to control the effective diameters of the pulleys. An actuator such as an electromechanical actuator can be used to change the distance between pulley segments. As noted above, a linear actuator can in some embodiments be coupled between both pulley segments and used to pull the segments together or push the segments away from one another. In other embodiments, a linear actuator can be coupled to and disposed on the outer side of one of the pulley segments and used to translate that pulley segment relative to the unconnected pulley segment. In other embodiments, one of the pulley segments may include one or more permanent magnets, and an electromagnetic field on the other pulley segment could be used to generate forces which push or pull the segments away from one another. In any of the embodiments discussed herein where an actuator or other mechanism is used to control the spacing between the pulley segments, a spring or other biasing coupling between the pulley segments may also be used.

Electromagnetic forces may also be used to effectuate a coupling between the IVT components and a motive element such as an electric motor. In some implementations, the motive element can be integrated into the IVT by coupling component of the motive element, such as a prime electromagnet of the motive element, to an IVT component, such that the component of the motive element rotates and/or orbits with the IVT component during operation of the IVT. For example, the prime electromagnet of the motive element may be concentric with an eccentric cam coupled to one of the pulley segments. If another component of the motive element is sufficiently constrained in some manner, operation of the motive element which induces rotation of the integrated component of the motive element will induce rotation and/or orbiting of the IVT component and serve as the input for the IVT.

As discussed above, some variable transmission ratios may be controlled by hydraulic mechanisms. FIG. 21 schematically illustrates an embodiment of a variable transmission including two hydraulically controlled segmented pulleys. The transmission 1800 includes a belt 1840, outer pulley segments 1822a and 1822b, and inner pulley segments 1832a and 1832b. The transmission 1800 also includes a hydraulic pump 1850 in fluid communication with a first hydraulic chamber 1852 within outer pulley segment 1822b and a second hydraulic chamber 1854 within inner pulley segment 1832b. By controlling the volume of hydraulic fluid within the first hydraulic chamber 1852, the position of the contact surface 1824b of the outer pulley segment 1822b can be moved to vary the effective diameter of the outer pulley. Similarly, by controlling the volume of hydraulic fluid within the second hydraulic chamber 1854, the position of the contact surface 1834b of the inner pulley segment 1832b can be moved to vary the effective diameter of the inner pulley 1834b. The movable portions of the outer and inner pulley segments 1822b and 1832b, respectively, are operated as hydraulic pistons.

In an embodiment where the outer pulley is rotationally fixed, the first hydraulic chamber 1852 may be in fluid communication with the hydraulic pump 1850 via a hydraulic line 1856a extending between the first hydraulic chamber 1852 and the hydraulic pump 1850. The second hydraulic chamber 1854 can be in fluid communication with the hydraulic pump 1850 via a hydraulic line 1856b which includes a rotating hydraulic fluid seal 1858, to maintain fluid communication while the inner pulley segment 1832b rotates and orbits within the transmission.

The hydraulic system may be a differential system, in which a constant pressure is used to bias pulley segments towards one another to create belt tension, similar to the use of a spring or other biasing coupling. A pressure differential between the pressure within the first hydraulic chamber 1852 within the outer pulley segment 1822b and the second hydraulic chamber 1854 within the inner pulley segment 1832b can cause relative shifts in the effective diameters of the inner and outer pulleys, shifting the transmission ratio. In other embodiments, a single hydraulic chamber within only one of the inner or outer pulleys, such as the rotationally fixed pulley, may be used.

Figure 22:
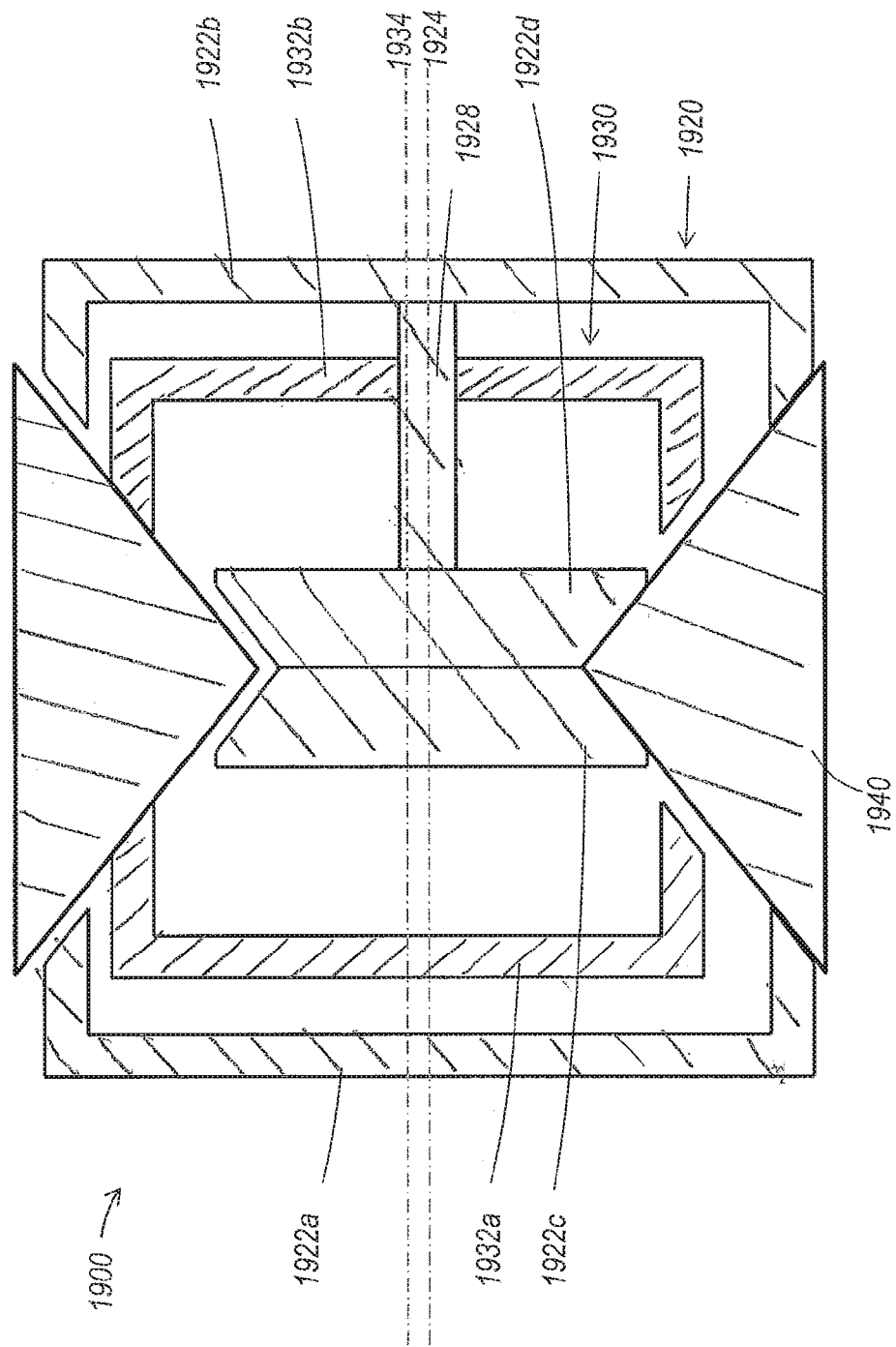
FIG. 22 schematically illustrates an example of a variable transmission in which one of the segmented pulleys includes more than two pulley segments.

In some embodiments, a segmented pulley can have more than two contact areas with a belt. FIG. 22 schematically illustrates an example of a variable transmission in which one of the segmented pulleys includes more than two pulley segments. The transmission 1900 includes a rotationally fixed pulley 1920 centered about an axis 1920, which includes a pair of outer pulley segments 1922a and 1922b, as well as a pair of inner pulley segments 1922c and 1922d. The inner pair of pulley segments 1922c and 1922d is rotationally coupled to the outer pair of pulley segments 1922a and 1922b, using a mechanism such as bar 1928 or any other suitable structure, so that the inner and outer pairs of pulley segments function as a single rotationally fixed pulley 1920.

The transmission 1900 also includes a pulley 1930 configured to rotate around an axis 1930 and including a first segment 1932a and a second segment 1932b. The first segment 1932a of the pulley 1930 is disposed longitudinally outward of at least a portion of inner pulley segment 1922c of pulley 1920, and longitudinally inward of at least a portion of outer pulley segment 1922a of pulley 1920. Similarly, the second segment 1932b of the pulley 1930 is disposed longitudinally outward of at least a portion of inner pulley segment 1922d of pulley 1920, and longitudinally inward of at least a portion of outer pulley segment 1922b of pulley 1920. In the illustrated embodiment, the bar 1928 or other structure rotationally coupling the inner pair of pulley segments 1922c and to the outer pair of pulley segments 1922a and 1922b of pulley 1920 extends through a central portion of one of the pulley segments 1932b, although other structures and methods for rotationally fixing the segments of the pulley 1920 may be used in other embodiments.

The pulley 1920 has one contact surface on each of the pulley segments, so that there are four contact surfaces with the belt 1940. The contact surfaces of the outer pair of pulley segments 1922a and 1922b of the pulley 1920 are located radially outward of the contact surfaces of the pulley segments 1932a and 1932b of the pulley 1930. The contact surfaces of the inner pair of pulley segments 1922c and 1922d are located radially inward of the contact surfaces of the pulley segments 1932a and 1932b of the pulley 1930. This arrangement can increase the efficiency and stiffness of the transmission 1900 by reducing or completely eliminating the unbalanced bending moment placed on the belt 1940 with only a pair of contact surfaces per segmented pulley.

The IVTs and CVTs discussed herein may not be the only transmission utilized in a given device. In some embodiments, the IVTs and CVTs described herein may be used as part of a multistage embodiment, in which one or more additional transmissions or other structures may be used to modify the output of a motor or other prime mover. In some embodiments, a fixed transmission may be used in conjunction with an IVT or CVT to increase the range of transmission ratios which the system can provide. For example, the fixed transmission may be used in series with an IVT or CVT as described in the embodiments above. In other embodiments, an IVT or CVT as described in the embodiments herein may be used in conjunction with another variable transmission, including a variable transmission of a design different than those described herein. In still other embodiments, additional linkages or structures may be used to compensate for the eccentricity of the input and/or output, without necessarily impacting the overall transmission ratio of the device.

As discussed elsewhere herein, a variety of methods can be used to compensate for or eliminate the eccentricity of the output of a variable transmission configured for use as an IVT. FIG. 23A schematically illustrates one embodiment of a variable transmission in which the eccentricity of the rotational output of an eccentrically orbiting pulley is eliminated. The transmission 2000a includes a rotationally fixed pulley 2020 centered on an axle 2026. The pulley 2020 is linked to a pulley 2030 by a belt 2040, such that the pulley 2030 can be configured to orbit the rotationally fixed pulley and rotate about an axle 2036.

The pulley 2030 is rotationally coupled to a rotating member 2060a, which may be a gear, a sprocketed wheel, or any other suitable mechanism. The rotating member 2060a may be an extension of the pulley, or may be rotationally coupled to the pulley in any other suitable manner. A belt or chain 2070 couples the rotating member 2060a to a rotating member 2080a configured to rotate around the axle 2026. The rotating member 2080a can serve as an output for the transmission 2000a, and rotates with less eccentricity than the eccentrically orbiting pulley 2030. In the illustrated embodiment, in contrast to the rotation of the orbiting pulley 2030, the rotation of the rotating member 2080a has no eccentricity in its output.

In some embodiments, the linkage which eliminates the eccentricity can also serve as a fixed ratio transmission to further alter the transmission ratio of the overall structure. FIG. 23B schematically illustrates another embodiment of a variable transmission in which the eccentricity of the rotational output of an eccentrically orbiting pulley is eliminated. The transmission 2000b differs from the transmission 2000a of FIG. 23A in that the diameters of the rotating members 2060b and 2080b are different from one another. Thus, in addition to eliminating the eccentricity of the output, the linkage formed by rotating members 2060b and 2080b and belt 2070 will also alter the angular velocity of the output, in that the angular velocity of the output rotating member 2080b will be lower than the angular velocity of the rotation of the pulley 2030. By controlling the relative diameters of the rotating members 2060b and 2080b, the transmission ratio of the fixed transmission formed by the linkage of rotating members 2060b and 2080b and belt 2070 can be controlled.

Instead of aligning the rotational axis of an IVT with the axis about which the rotationally fixed pulley is centered, other axes of rotation can be used, and the design of the IVT adjusted as needed to compensate. For example, both pulleys can orbit around each other, where a neutral axis between them is chosen for the input and output. In such an embodiment, the eccentric wobble of the IVT can be greatly reduced and in some embodiments nearly eliminated, although the design of the IVT may be more complex, as additional linkages and other structures may be used to align the input and output with the neutral axis.

Thus, the output rotating member need not be aligned with the axis of the rotationally fixed pulley. FIG. 23C schematically illustrates another embodiment of a variable transmission in which the eccentricity of the rotational output of an eccentrically orbiting pulley is eliminated. In the transmission 2000c, both the rotationally fixed pulley 2020 and the pulley 2030 are configured to rotate around a point 2090 located between the axes 2026 and 2036 of the pulleys 2020 and 2030. The point 2090 may be the center of rotation of the transmission 2000c, and its location may be based at least in part on the relative masses of the two pulleys 2020 and 2030.

While the rotating member 2060c rotationally coupled to the freely rotatable pulley 2030 may still be aligned with the axis 2036 of the pulley 2030, the rotating member 2080c is, in the illustrated embodiment, aligned with the axis of rotation of the transmission 2000c, rather than with the axis 2026 of the pulley 2020. Thus, even though both the rotationally fixed pulley 2020 and the rotating pulley 2030 orbit around the axis of rotation of the transmission 2000c, the eccentricity can be eliminated from the output, and the rotational motion of the pulley 2030 can be harvested.

Although transmissions 2000a, 2000b, and 2000c utilize a belt or chain 2070 to couple an eccentrically orbiting rotatable member to a non-eccentric rotatable member, any other suitable structure may also be used. For example, in some embodiments, a gear chain or a sprocket chain may be used to couple an eccentrically orbiting rotatable member to a non-eccentric rotatable member. Similarly, transmissions 2000a, 2000b, and 2000c are illustrated using non-nested pulleys to more clearly illustrate the interaction of the pulleys and the output linkage which eliminates the eccentricity. However, the same or similar structures may be used to compensate for the eccentricity in a nested embodiment.

FIG. 23D schematically illustrates an embodiment of a nested variable transmission in which the eccentricity of the rotational output of an eccentrically orbiting pulley is eliminated. The transmission 2000d includes a rotationally fixed outer pulley 2020 and a nested inner pulley 2030. The segments of outer pulley 2020 are in a ring shape, with an aperture 2024 therein. The axis of the nested inner pulley is configured to orbit around the axis 2026 of the rotationally fixed outer pulley 2020 along path 2038.

A rotating member 2060d is rotationally coupled to the inner pulley 2030, and the rotating member 2060d is in turn coupled to a rotating member 2080d rotatable about an axis 2026 that is aligned with the axis of rotation of the transmission 200d. The rotating member 2080d can provide a non-eccentric output to the system. In the illustrated embodiment, the rotating member 2060d is directly coupled to the rotating member 2080d, such as through the use of gears or sprockets, although a belt or chain coupling or any other suitable coupling may also be used. It can also be seen that the diameters of the rotating members 2060d and 2080d are the same, so that the magnitude of the angular velocity of the output will remain the same, although the direction will be reversed.

FIG. 23E schematically illustrates another embodiment of a nested variable transmission in which the eccentricity of the rotational output of an eccentrically orbiting pulley is eliminated. The transmission 2000e differs from the transmission 2000d of FIG. 23D in that the diameters of the rotating members 2060e and 2080e are different from one another. Thus, in addition to eliminating the eccentricity of the output, the linkage formed by rotating members 2060e and 2080e will also alter the angular velocity of the output, in that the angular velocity of the output rotating member 2080e will be higher than the angular velocity of the rotation of the pulley 2030, and in the opposite direction. The transmission ratio of the fixed transmission formed by the linkage of rotating members 2060e and 2080e can be controlled by changing the sizes and number of gears or other members in the chain.

FIG. 24 is a top plan view of an embodiment of a variable transmission in which two pulleys are configured to orbit around a rotational axis of the variable transmission. The transmission 2100 includes a mechanically grounded axle 2116, and a bar 2150 coupled to the axle 2116 via a bearing 2085, to allow rotation of the bar 2150 about the axle 2116. The axle 2116 is aligned with a rotational axis 2104 of the variable transmission, as discussed in greater detail below. The application of a torque to the bar 2150 to induce rotation of the bar 2150 can serve as an input for the transmission 2100.

The transmission 2100 includes an axle 2126 coupled to the bar 2150, and a first segmented pulley 2120 coupled to the axle 2126. The axle 2126 is aligned with an axis 2124 about which the pulley 2120 is centered. The transmission 2100 also includes another axle 2136 coupled to the bar 2150, and a second segmented pulley 2130 coupled to the axle 2136. The axle 2136 is aligned with an axis 2126 about which the pulley 2130 is configured to rotate. Application of a torque to the bar 2150 to induce rotation of the bar 2150 will also result in eccentric orbiting of the axles 2126 and 2136 around the rotational axis 2104 of the transmission 2100.

In the illustrated embodiment, the first segmented pulley 2120 may be rotationally fixed. This may be accomplished in any suitable fashion, but in the illustrated embodiment, a first cylindrical member 2112 may be coupled to the mechanically grounded axle 2116, and may be coupled to a second cylindrical member 2114 via a chain 2118 or other suitable mechanism. In some embodiments, the cylindrical members 2112 and 2114 may be geared, or sprockets may be used in the coupling of first and second cylindrical members 2112 and 2114. In other embodiments, Oldham couplings, gear or sprocket arrangements, or other suitable couplings may be used. When the effective diameter of the cylindrical members 2112 and 2114 are equal to one another, the coupling between the cylindrical members 2112 and 2114 will have an infinite transmission ratio or be zero geared, such that the cylindrical member 2114 will be rotationally fixed as well. When the cylindrical member 2114 is rotationally coupled to the first segmented pulley 2120, the first segmented pulley will be rotationally fixed or rotationally grounded, as well. The second cylindrical member 2114 may be rotationally coupled to the first segmented pulley 2120 using a coupling member 2128, or by being directly connected to or even an integral part of one of the segments of the first segmented pulley 2120.

In contrast, the second segmented pulley is not rotationally fixed, and is free to rotate about the axle 2136. The second segmented pulley 2130 is rotationally coupled to a first rotatable member 2160, such as through a coupling member 2128 or other suitable connection. The second segmented pulley 2130 is also coupled to the first segmented pulley via belt 2140.

The first rotatable member 2160 is in turn coupled to a second rotatable member 2180, which is aligned with and configured to rotate about the rotational axis 2104 of the transmission 2100. An output shaft 2105 rotationally coupled to the second rotatable member 2180 can be used as the output of the transmission 2100. Differences in the effective diameters of the first and second rotatable members 2160 and 2180 can be used to provide an integrated fixed-ratio transmission stage to alter the angular velocity of the output, as discussed above with respect to embodiments such as FIGS. 23B and 23E. The output shaft 2105 can be disconnected from the axle 2116 or coupled to the axle 2116 in such a way that one of the axle 2116 and the output shaft 2105 can support the other without being rotationally coupled to the other.

Thus, the coupling between the first rotatable member 2160 and the second rotatable member 2180 can eliminate the eccentricity of the output of the transmission. In addition, because both the rotationally fixed pulley 2120 and the freely rotatable pulley 2130 are configured to orbit around the rotational axis of the transmission 2100, the transmission 2100 can be designed to minimize or eliminate eccentric mass wobble of the transmission, as the first pulley 2120 and the second pulley 2130 orbit out of phase with one another. The out of phase rotation of the first and second segmented pulleys is compelled by the rigid bar 2150 which defines the spacing between the axle 2126 and the axle 2136.

While the embodiment of FIG. 24 is illustrated using non-nested pulleys for clarity, a transmission with partially or fully nested pulleys can similarly be configured such that both pulleys eccentrically orbit a neutral or rotational axis of the transmission, in order to minimize or eliminate eccentric mass wobble. In some embodiments, due to the relatively small eccentricity as compared to non-nested transmissions, couplings other than gear or sprocket chains may be used. For example, Oldham couplings may be used to couple an eccentrically orbiting component to another component.

In some embodiments, the use of multiple eccentric cams coupled to a single pulley can allow orbiting of the pulley while preventing rotation. The eccentric cams can define an orbiting path of the pulley relative to the rotational axis of the transmission, and with respect to the rotationally unconstrained pulley orbiting out of phase with the rotationally-fixed pulley. A single eccentric cam can be coupled to the rotationally unconstrained pulley, to allow both orbiting and rotation of the rotationally unconstrained pulley.

In still other variations, embodiments described and configured to operate as IVTs can be modified for operation as a CVT, rather than an IVT. In addition, the nested pulley configurations described herein can be used even without the ability to modify the effective diameters of either pulley, in order to provide a compact fixed-ratio mechanism.

Other variations on the operation of the variable transmissions described herein may also be used. Control of the variable transmissions described herein may be based at least in part on the application in which the variable transmissions will be used. Because the variable transmission adds a degree of freedom to the coupling being controlled, a system utilizing of a variable transmission as part of a coupling becomes underconstrained. The additional degree of freedom allows for optimization of a parameter such as efficiency, response time, stiffness, or peak power availability, among others, in order to further optimize transmission behavior for particular applications.

For example, in some embodiments, the transmission ratio of the variable transmission may be controlled during operation so as to maintain a constant output velocity as the input velocity varies over time. Such a control parameter may be useful when the variable transmission is used as part of an electricity generating system. Similarly, the output velocity may be further modulated to compensate for rapid changes in system conditions, such as a sudden drop in line voltage. In particular, embodiments of variable transmissions described herein which allow rapid changes in transmission ratios may be more responsive than systems incorporating alternators with energized coils, due to the high inductance of these motors.

In other embodiments, the variable transmission may be controlled to provide a constant force or other known force profile at a joint. Such a control parameter may be useful in robotics applications or other applications in which machinery is operated near humans, or in applications involving the manipulation of objects which are relatively fragile in comparison to the manipulating machinery. For example, in applications in which machinery is used to augment human power, controlling the force generated at a joint may be an important safety parameter.

Additional components may be controlled in conjunction with the variable transmission to provide a desired effect. In some embodiments, to prepare for an event requiring high power output, a controller may increase the rotor speed of an electric motor while controlling a variable transmission to provide a constant output speed. Without affecting the current output of the system, such a control scheme will increase the kinetic energy of the system by storing it within the rotor rotating at an increased speed. A subsequent shift in the transmission ratio may be used to rapidly transfer this kinetic energy to the joint, providing a spike in power beyond what a traditional motor and fixed ratio transmission could deliver alone, and without the typical high energy losses within the motor winding.

The concepts described in this disclosure, although described in terms of a variable transmission which may be configured for operation as an IVT or a CVT may be generally applicable in various other situations within the field of transmissions.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

In the foregoing description, specific details are given to provide a thorough understanding of the examples. However, it will be understood by one of ordinary skill in the art that the examples may be practiced without these specific details. Certain embodiments that are described separately herein can be combined in a single embodiment, and the features described with reference to a given embodiment also can be implemented in multiple embodiments separately or in any suitable subcombination. In some examples, certain structures and techniques may be shown in greater detail than other structures or techniques to further explain the examples.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A variable transmission, comprising: an outer pulley, the outer pulley comprising:
a first outer pulley segment, the first outer pulley segment comprising a contact surface; and
a second outer pulley segment spaced apart from the first outer pulley segment by a first variable distance, the second outer pulley segment comprising a contact surface; an inner pulley, a portion of the inner pulley located between the first outer pulley segment and the second outer pulley segment, the inner pulley comprising:
a first inner pulley segment, the first inner pulley segment comprising a contact surface located axially and radially inward of the contact surface of the first outer pulley segment; and
a second inner pulley segment spaced apart from the first inner pulley segment by a second variable distance, the second inner pulley segment comprising a contact surface located axially and radially inward of the contact surface of the second outer pulley segment; and
a belt comprising a first length section, a second length section, a third length section, and a fourth length section, wherein the first length section of the belt is in contact with at least a portion of the contact surfaces of the first and second outer pulley segments, wherein the third length section of the belt is opposite the first length section of the belt and is in contact with at least a portion of the contact surfaces of the first and second inner pulley segments, wherein the second length section of the belt is between the first and third length sections of the belt and is not in contact with the contact surfaces of the inner or outer pulley segments, and wherein the fourth length section of the belt is between the first and third length sections of the belt and opposite the second length section of the belt and is not in contact with the contact surfaces of the inner or outer pulley segments.

2. The transmission of claim 1, wherein one of the outer and inner pulleys is rotationally fixed.

3. The transmission of claim 2, wherein the outer pulley is rotationally fixed, the transmission additionally comprising a shifting mechanism configured to move at least one of the first outer pulley segment and the second outer pulley segment relative to the other to control the first variable distance between the first outer pulley segment and the second outer pulley segment.

4. The transmission of claim 3, additionally comprising a spring coupled to the first inner pulley segment and the second inner pulley segment to adjust the second variable distance between the first inner pulley segment and the second inner pulley segment in response to changes in the first variable distance between the first outer pulley segment and the second outer pulley segment.

5. The transmission of claim 1, wherein the belt comprises a plurality of belt segments.

6. The transmission of claim 5, wherein the belt comprises a tension belt extending through each of the plurality of belt segments, and wherein the facing surfaces of the belt segments comprise curved surfaces.

7. The transmission of claim 5, wherein the belt comprises a plurality of pins, each pin extending through at least a portion of each of two adjacent belt segments of the plurality of belt segments.

8. The transmission of claim 1, additionally comprising a hydraulic pump in fluid communication with a first fluid chamber, wherein a change in the size of the first fluid chamber alters one of the first variable distance or the second variable distance.

9. The transmission of claim 1, wherein both the inner and outer pulleys are configured to orbit eccentrically about a rotational axis of the variable transmission.

10. The transmission of claim 9, wherein one of the outer pulley and the inner pulley is rotationally fixed.

11. The transmission of claim 10, wherein the rotationally fixed pulley is coupled to a plurality of eccentric cams.

12. The transmission of claim 1, additionally comprising an output structure configured to transmit the rotational output of an eccentrically orbiting pulley to a rotating output member configured to rotate with less eccentricity than the eccentrically orbiting pulley.

13. The transmission of claim 12, wherein the output structure comprises a fixed-ratio transmission.

* * * * *